(12) United States Patent
Kumamoto et al.

(10) Patent No.: US 12,091,564 B2
(45) Date of Patent: Sep. 17, 2024

(54) INK ACCOMMODATING BODY AND INK COMPOSITION

(71) Applicant: Seiko Epson Corporation, Tokyo (JP)

(72) Inventors: Kiyomi Kumamoto, Kitakyushu (JP); Yusuke Mizutaki, Shiojiri (JP); Tomohito Nakano, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 70 days.

(21) Appl. No.: 17/487,040

(22) Filed: Sep. 28, 2021

(65) Prior Publication Data

US 2022/0098427 A1 Mar. 31, 2022

(30) Foreign Application Priority Data

Sep. 29, 2020 (JP) .................................. 2020-163406

(51) Int. Cl.
*C09D 11/328* (2014.01)
*C09B 67/22* (2006.01)
(Continued)

(52) U.S. Cl.
CPC ........ *C09D 11/328* (2013.01); *C09B 67/0045* (2013.01); *C09D 11/033* (2013.01); *C09D 11/037* (2013.01)

(58) Field of Classification Search
CPC ................ C09D 11/328; C09D 11/033; C09D 11/037; C09B 67/0045; C09B 67/0046
See application file for complete search history.

(56) References Cited

U.S. PATENT DOCUMENTS

| 2004/0070655 A1* | 4/2004 | Aoi | C09D 11/38 347/100 |
| 2013/0176368 A1* | 7/2013 | Wheeler | C09D 11/38 347/100 |

(Continued)

FOREIGN PATENT DOCUMENTS

| CN | 107868516 A | 4/2018 |
| CN | 111133061 A | 5/2020 |

(Continued)

OTHER PUBLICATIONS

English Machine Translation of JP2020076048A ("Machine_Translation_Tateishi_JP_2020076048_A") (Year: 2020).*
English Machine Translation of WO2017213213A1 ("Machine_Translation_Mizutani_WO_2017213213_A1") (Year: 2017).*
English machine translation of JP-2019084766-A (Year: 2019).*
English machine translation of WO-2017213213-A1 (Year: 2017).*

*Primary Examiner* — Jennifer A Smith
*Assistant Examiner* — Jeffrey Eugene Barzach
(74) *Attorney, Agent, or Firm* — Harness, Dickey & Pierce, P.L.C.

(57) ABSTRACT

An ink accommodating body accommodating an ink composition is provided, in which the ink composition contains water and a first dye that is a compound represented by Formula (B-1) or a salt thereof, a content of the first dye in the ink composition is 0.5% by mass or more with respect to a total amount of the ink composition, and a value of a ratio (A/V) is 1.7 or less where a total surface area of a metal, of the ink accommodating body, in contact with the ink composition is A (cm$^2$) and an accommodation capacity for the ink composition accommodated in the ink accommodating body is V (cm$^3$).

(Continued)

Formula (B-1)

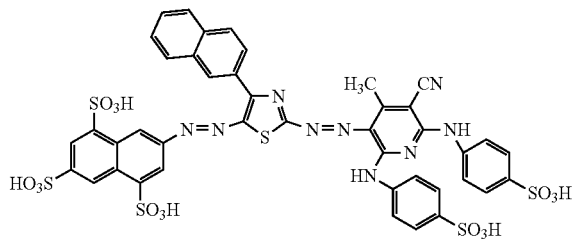

6 Claims, 16 Drawing Sheets

(51) Int. Cl.
*C09D 11/033* (2014.01)
*C09D 11/037* (2014.01)

(56) References Cited

U.S. PATENT DOCUMENTS

| | | | |
|---|---|---|---|
| 2018/0086929 | A1 | 3/2018 | Hayashi et al. |
| 2018/0244934 | A1 | 8/2018 | Murai et al. |
| 2018/0346743 | A1* | 12/2018 | Tateishi ............... C09D 11/328 |
| 2019/0023927 | A1* | 1/2019 | Hama ................... B41M 5/0023 |
| 2020/0190427 | A1* | 6/2020 | Gutierrez .............. C11B 13/005 |
| 2020/0216701 | A1 | 7/2020 | Tateishi et al. |
| 2020/0238716 | A1 | 7/2020 | Okada et al. |

FOREIGN PATENT DOCUMENTS

| | | | |
|---|---|---|---|
| JP | H11-005932 A | | 1/1999 |
| JP | 2008-018663 A | | 1/2008 |
| JP | 2014-168942 A | | 9/2014 |
| JP | 2018-141102 A | | 9/2018 |
| JP | 2019084766 A | * | 6/2019 |
| JP | 2020076048 A | * | 5/2020 |
| WO | WO-2017213213 A1 | * | 12/2017 ............... B41J 2/175 |

\* cited by examiner

INK ACCOMMODATING BODY AND INK COMPOSITION

The present application is based on, and claims priority from JP Application Serial Number 2020-163406, filed Sep. 29, 2020, the disclosure of which is hereby incorporated by reference herein in its entirety.

BACKGROUND

1. Technical Field

The present disclosure relates to an ink accommodating body and an ink composition.

2. Related Art

In an ink jet recording method, when an achromatic image is formed with a black ink alone, graininess may appear in a case where the achromatic color thereof is light. In order to eliminate the appearance of such graininess, it is known that an achromatic region is formed by using a black ink, a yellow ink, a magenta ink, and a cyan ink in combination.

For example, JP-A-2014-168942 discloses an ink jet recording method for recording an achromatic image by adhering a black ink containing a specific black dye and a color ink containing a specific dye to a recording medium at a duty of 30% or less, and there is a description that an achromatic image having excellent hue, granularity, and ozone resistance can be obtained even when a duty is low.

However, some of specific dyes that can improve granularity and ozone fastness of the obtained image are inferior in storage stability, and color developability may deteriorate due to storage. It is thought that the chemical structure of a dye is one cause of decrease in color developability due to such storage, but the mechanism has not necessarily been elucidated. That is, an ink accommodating body capable of accommodating an ink composition, which has good ozone fastness, with good storage stability is desired.

SUMMARY

According to an aspect of the present disclosure, an ink accommodating body is an ink accommodating body accommodating an ink composition, in which the ink composition contains water and a first dye that is a compound represented by Formula (B-1) or a salt thereof, a content of the first dye in the ink composition is 0.5% by mass or more with respect to a total amount of the ink composition, and a value of a ratio (A/V) is 1.7 or less where a total surface area of a metal, of the ink accommodating body, in contact with the ink composition is A ($cm^2$) and an accommodation capacity for the ink composition accommodated in the ink accommodating body is V ($cm^3$).

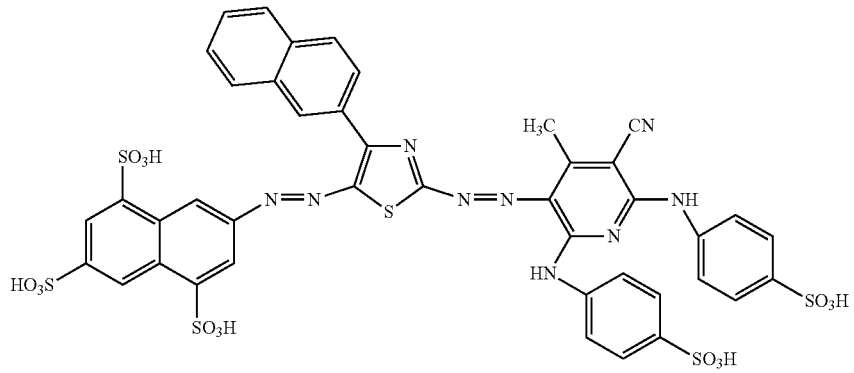

Formula (B-1)

According to another aspect of the present disclosure, an ink composition contains: water; a first dye that is a compound represented by Formula (B-1) or a salt thereof; and a second dye selected from a compound represented by Formula (M-1) or a salt thereof and a compound represented by Formula (M-2) or a salt thereof, in which a content of the first dye is 0.5% by mass or more with respect to a total amount of the ink composition.

Formula (B-1)

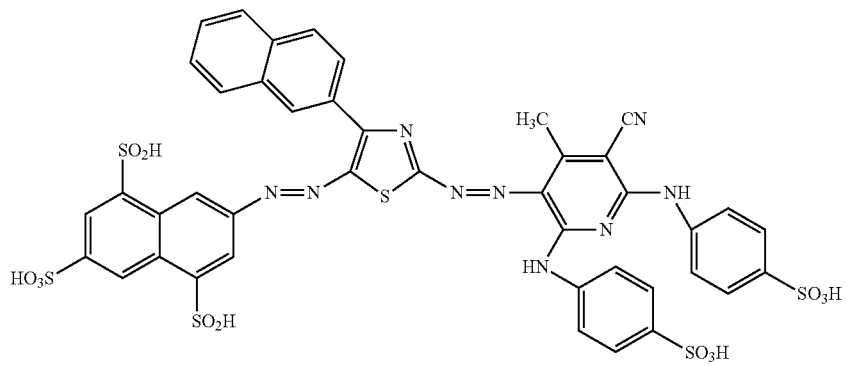

Formula (M-1)

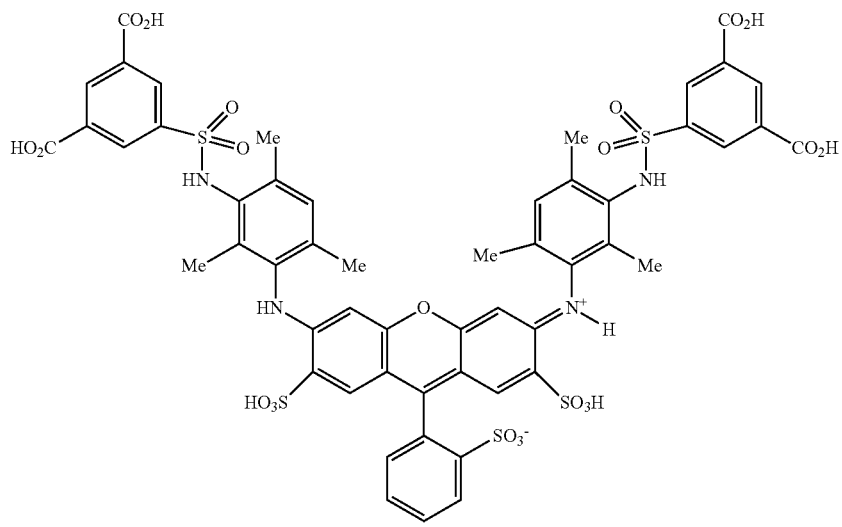

Formula (M-2)

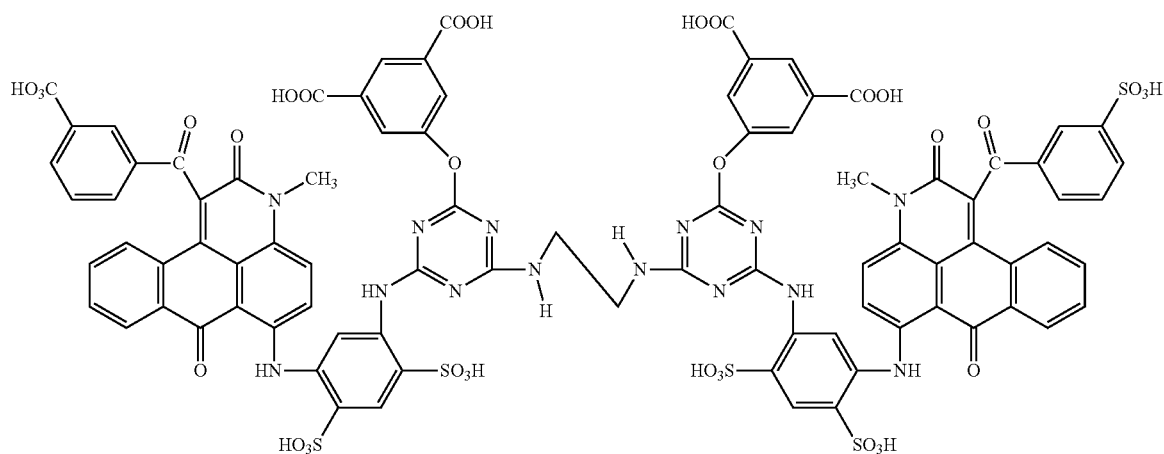

According to still another aspect of the present disclosure, an ink composition is an ink composition accommodated in an ink accommodating body, the ink composition containing: water; and a first dye that is a compound represented by Formula (B-1) or a salt thereof, in which a content of the first dye is 0.5% by mass or more with respect to a total amount of the ink composition, and a value of a ratio (A/V) is 1.7 or less where a total surface area of a metal, of the ink accommodating body, in contact with the ink composition is A ($cm^2$) and an accommodation capacity for the ink composition accommodated in the ink accommodating body is V ($cm^3$).

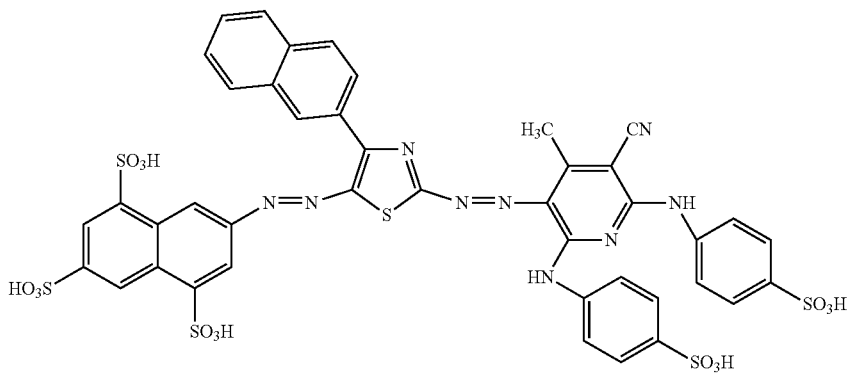

Formula (B-1)

DESCRIPTION OF EXEMPLARY EMBODIMENT

Figure 1:
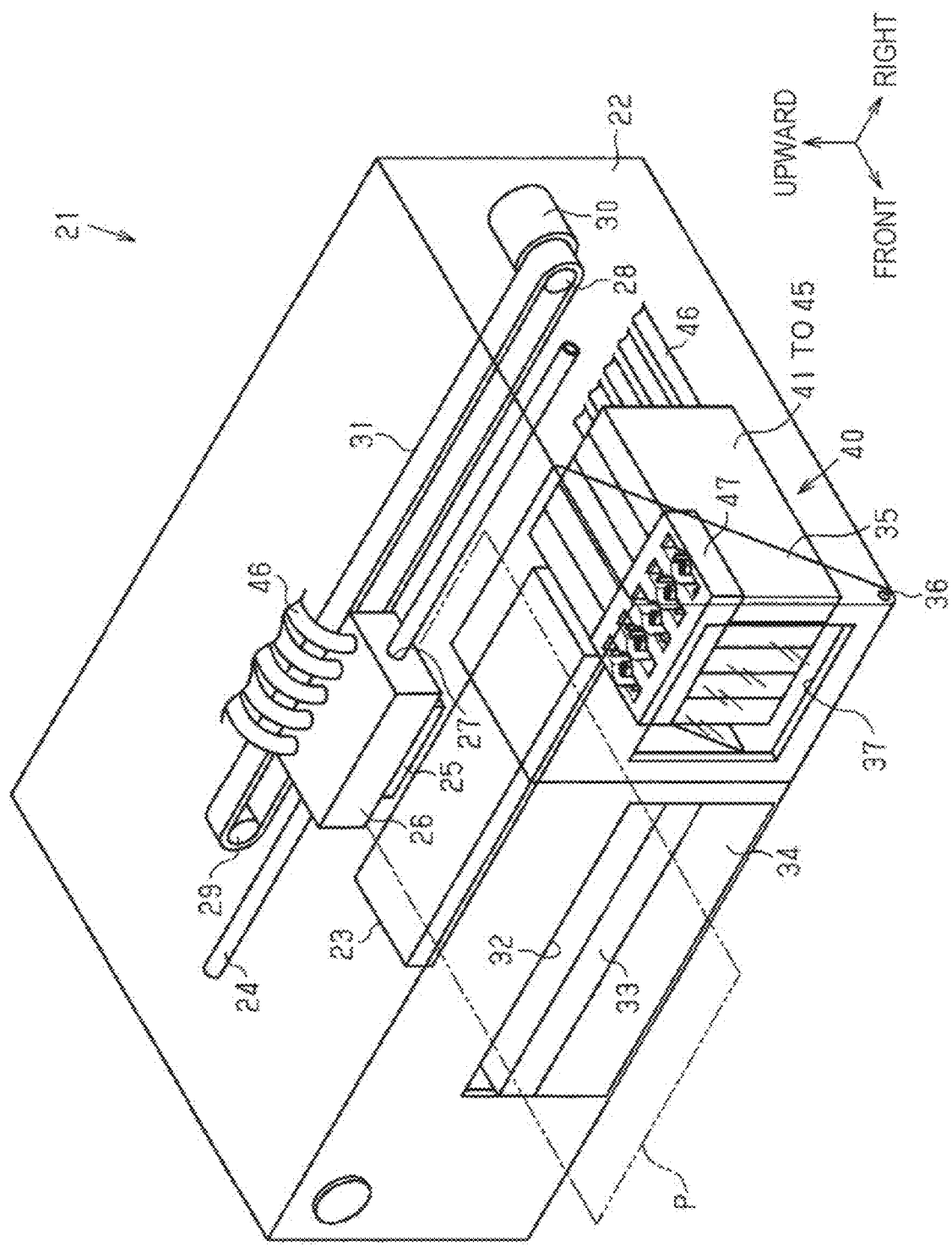
FIG. 1 is a perspective view schematically showing a schematic configuration of a recording device of a first embodiment in a perspective state.

Embodiment of the present disclosure will be described below. The embodiment described below describe an example of the present disclosure. The present disclosure is not limited to the following embodiment and includes various modified embodiments carried out within a range not changing the gist of the present disclosure. Not all of configurations described below are essential configurations of the present disclosure.

1. Ink Accommodating Body

An ink accommodating body according to the present embodiment is an ink accommodating body accommodating an ink composition. The ink composition accommodated in the ink accommodating body contains water and a first dye. Furthermore, a content of the first dye in the ink composition is 0.5% by mass or more with respect to a total amount of the ink composition, and a value of a ratio (A/V) is 1.7 or less where a total surface area of a metal, of the ink accommodating body, in contact with the ink composition is A ($cm^2$) and an accommodation capacity for the ink composition accommodated in the ink accommodating body is V ($cm^3$).

Hereinafter, the ink composition accommodated in the ink accommodating body will be described, and thereafter the ink accommodating body will be described.

1.1. Ink Composition

The ink composition accommodated in the ink accommodating body of the present embodiment contains water and the first dye. Because the ink composition can be particularly preferably used for ink jet recording, the ink composition may be used as an ink jet ink composition.

1.1.1. Water

The ink composition according to the present embodiment contains water. Examples of water include pure water such as ion exchange water, ultra-filtered water, reverse osmosis water, and distilled water; and ultrapure water, from which ionic impurities have been removed as much as possible. Furthermore, when water sterilized by irradiation with ultraviolet rays, addition of hydrogen peroxide, or the like is used, generation of bacteria and fungi can be inhibited in a case where the ink composition is stored for a long period of time.

A content of the water is preferably 40% by mass or more, more preferably 45% by mass or more, and even more preferably 50% by mass or more, with respect to a total amount (100% by mass) of the ink composition. When the content of the water is 40% by mass or more, viscosity of the ink composition can be sufficiently lowered.

Furthermore, an upper limit of the content of the water is preferably 95% by mass or less, more preferably 90% by mass or less, and even more preferably 85% by mass or less, with respect to the total amount of the ink composition.

1.1.2. First Dye

The ink composition according to the present embodiment contains the first dye that is a compound represented by Formula (B-1) or a salt thereof.

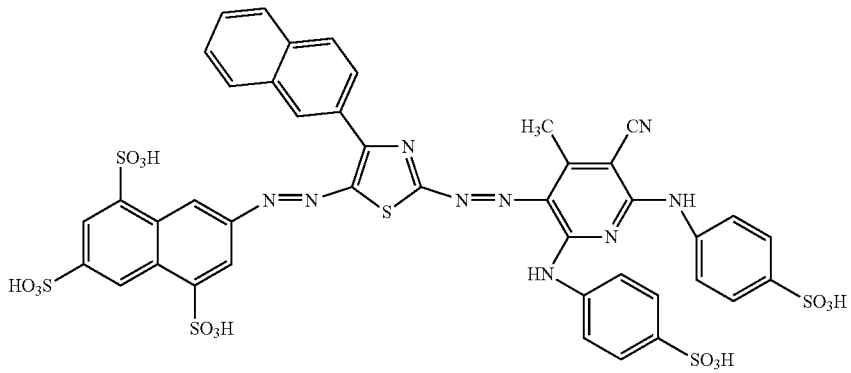

Formula (B-1)

Examples of the salt of the compound represented by Formula (B-1) include compounds in which at least one H of four SO$_3$H groups is independently Li, Na, K, and NH$_3$. That is, examples of the salt of the compound represented by Formula (B-1) include a lithium salt, a sodium salt, a potassium salt, an ammonium salt, and a salt in which these salts are mixed. Furthermore, the salt of the compound represented by Formula (B-1) can be said to be a salt in which at least one of hydrogen ion, lithium ion, sodium ion, potassium ion, and ammonium ion is present in an aqueous solution when the salt is ionized in the aqueous solution.

The first dye is a black-based dye and has a maximum absorption wavelength of 550 nm or more and 630 nm or less. By the ink composition containing the first dye, it is possible to obtain a gray ink or a black ink which easily develops neutral black (black that is not bluish or reddish).

Furthermore, because the first dye is excellent in ozone fastness, ozone fastness of an image formed with the ink composition of the present embodiment can be improved.

1.1.3. Other Dyes

The ink composition of the present embodiment may contain the following dyes in addition to the above-mentioned first dye.

1.1.3. (1) Second Dye

The ink composition may contain a second dye having a maximum absorption wavelength of 500 nm or more and 580 nm or less. Dyes having a maximum absorption wavelength within the range of 500 nm or more and 580 nm or less have a magenta hue.

When the ink composition contains the second dye, it is easier to bring the hue of an image, which is formed with the ink composition, close to neutral.

The second dye may be a mixture of a plurality of kinds of dyes. When the ink composition contains the second dye, a content of the entire second dye in the ink composition is 0.15% by mass or more and 5.0% by mass or less, is preferably 0.2% by mass or more and 2.0% by mass or less, and is more preferably 0.3% by mass or more and 0.5% by mass or less, with respect to a total amount of the ink composition.

Furthermore, when the ink composition contains the second dye, in terms of a ratio with the first dye, the content of the entire second dye is preferably 0.05 or more and 1.00 or less, is more preferably 0.1 or more and 0.8 or less, and is even more preferably 0.1 or more and 0.5 or less, as a mass ratio of the content of the second dye to the content of the first dye when the content of the first dye is 1.

The second dye is more preferably selected from a compound represented by Formula (M-1) or a salt thereof, a compound represented by Formula (M-2) or a salt thereof, and a compound represented by Formula (M-3) or a salt thereof, from the viewpoints of color developability, ozone resistance, light resistance, and the like.

Formula (M-1)

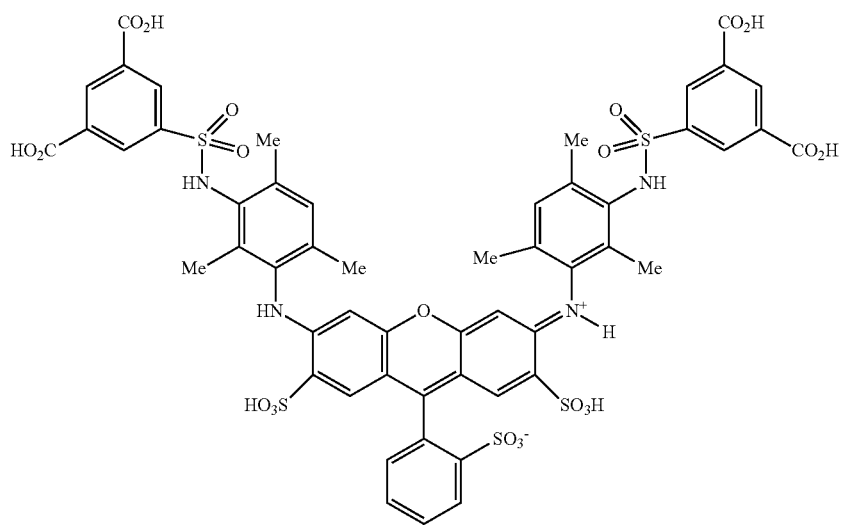

Formula (M-2)

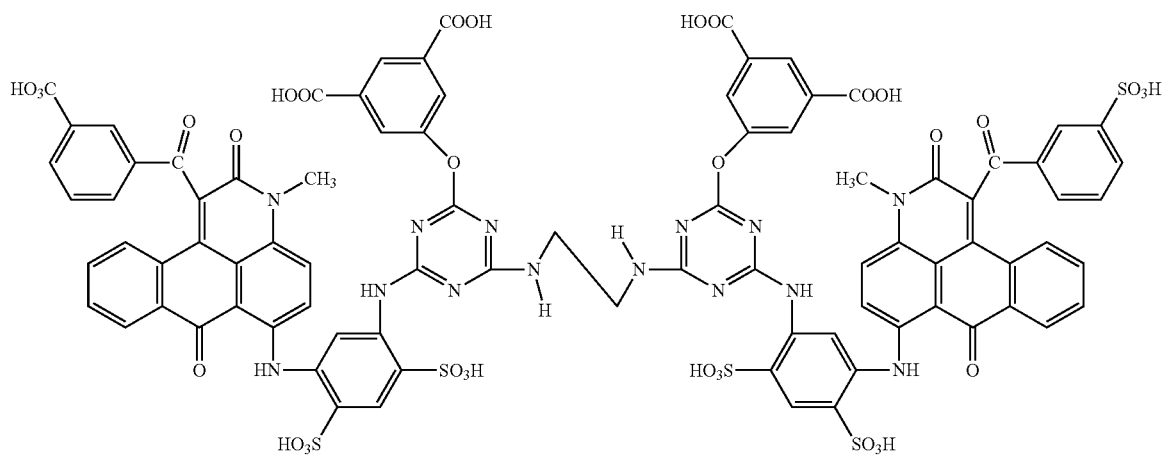

Formula (M-3)

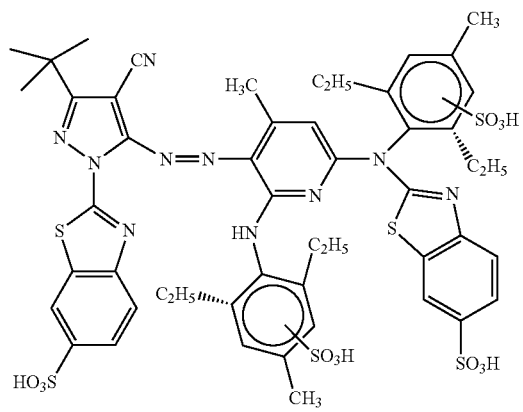

Several acid groups are contained in each structure of Formula (M-1), Formula (M-2), and Formula (M-3), but these may be each independently in the form of an acid salt. Examples of counter cations of the salt include hydrogen ion (proton), lithium, sodium, potassium, ammonium, and the like. Counter cations in each acid group may be the same as or different from each other.

Furthermore, the second dye is even more preferably selected from the compound represented by Formula (M-1) above or a salt thereof and the compound represented by Formula (M-2) above or a salt thereof from the viewpoint of further improving color developability, ozone resistance, light resistance, and the like. In particular, the compound represented by Formula (M-1) or a salt thereof is preferable because good ozone resistance tends to be maintained. In particular, the compound represented by Formula (M-2) or a salt thereof is preferable from the viewpoint of improving color developability.

When the second dye is selected from the compound represented by Formula (M-1) or a salt thereof and the compound represented by Formula (M-2) or a salt thereof, it is easier to bring the hue of an image, which is formed with the ink composition, closer to neutral.

When the second dye is used, the second dye functions as a complementary color to a tint of the first dye contained in the ink composition, and thereby an image having a more neutral hue can be formed with the accommodated ink composition. The first dye has a slight green tint.

When the ink composition contains, as the second dye, both the compound represented by Formula (M-1) or a salt thereof and the compound represented by Formula (M-2) or a salt thereof, the ink composition has a preferable content ratio. That is, in this case, it is more preferable that a content of the compound represented by Formula (M-1) or a salt thereof in the ink composition be smaller than a content of the compound represented by Formula (M-2) or a salt thereof in the ink composition. Accordingly, it is possible to form an image having a neutral hue while maintaining good ozone resistance.

1.1.3. (2) Third Dye

The ink composition may contain a third dye having a maximum absorption wavelength of less than 480 nm. Dyes having a maximum absorption wavelength within the range of less than 480 nm have a yellow hue.

When the ink composition contains the third dye, the hue of an image formed with the ink composition is likely to be close to neutral.

The third dye may be a mixture of a plurality of kinds of dyes. When the ink composition contains the third dye, a content of the entire third dye in the ink composition is 0.15% by mass or more and 5.0% by mass or less, is preferably 0.2% by mass or more and 2.0% by mass or less, and is more preferably 0.2% by mass or more and 0.5% by mass or less, with respect to a total amount of the ink composition.

Furthermore, when the ink composition contains the third dye, in terms of a ratio with the first dye, the content of the entire third dye is preferably 0.05 or more and 1.00 or less, is more preferably 0.1 or more and 0.8 or less, and is even more preferably 0.1 or more and 0.5 or less, as a mass ratio of the content of the third dye to the content of the first dye when the content of the first dye is 1.

The third dye is more preferably selected from a compound represented by Formula (Y-1) or a salt thereof and a compound represented by Formula (Y-2) or a salt thereof from the viewpoints of color developability, ozone resistance, light resistance, and the like.

Formula (Y-1)

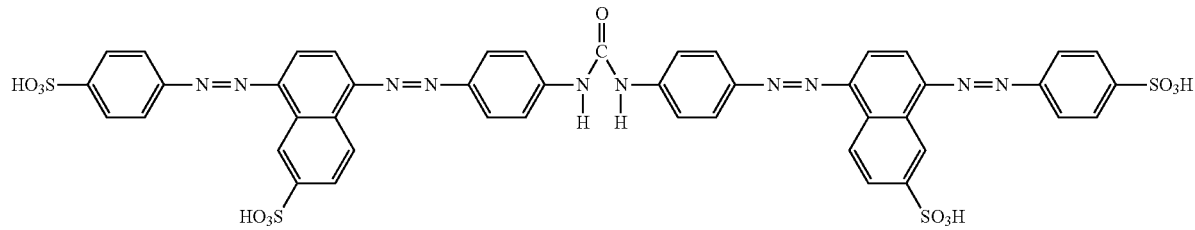

Formula (Y-2)

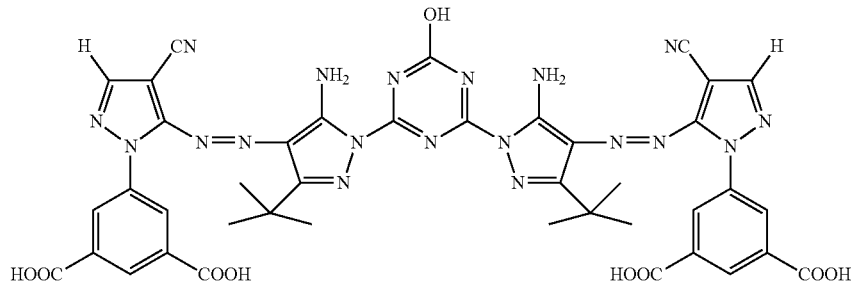

Several acid groups are contained in each structure of Formula (Y-1) and Formula (Y-2), but these may be each independently in the form of an acid salt. Examples of counter cations of the salt include hydrogen ion (proton), lithium, sodium, potassium, ammonium, and the like. Counter cations in each acid group may be the same as or different from each other.

Furthermore, the third dye is more preferably the compound represented by Formula (Y-1) above or a salt thereof from the viewpoint of further improving color developability, ozone resistance, light resistance, and the like.

When the third dye is the compound represented by Formula (Y-1) or a salt thereof, it is easier to bring the hue of an image, which is formed with the ink composition, closer to neutral.

1.1.3. (3) Other Dyes

The ink composition of the present embodiment may contain a color material other than the first dye, the second dye, and the third dye. Examples of such color materials include C. I. Acid Black 1, 2, 24, 41, and 94; C. I. Direct Black 19, 29, 38, 51, 71, 122, 154, 168, and 195; C. I. Reactive Black 3, 4, 5, 8, 13, 14, 31, 34, 35, and 39; C. I. Basic Black 2 and 8; C. I. Direct Red 1, 4, 9, 80, 81, and 225; and C. I. Acid Red 52, 80, 82, 249, 254, and 289. However, it is preferable that these color materials be used in an amount of 0.5% by mass or less, preferably 0.3% by mass or less, and more preferably 0.1% by mass or less, with respect to the total amount of the ink composition. That is, in the ink composition, it is preferable to use the above-mentioned first dye, second dye, and third dye as the main dyes.

1.1.3. (4) Neutral Hue

The ink composition of the present embodiment has a hue of generally black to gray, and by using at least one of the above-mentioned second dye, the above-mentioned third dye, and the above-mentioned other dyes as necessary, it is easy to obtain a so-called neutral hue that is black or gray with a small other hue. The neutral hue means that, in the Lab color system, an absolute value of a* value is less than 2.5 and an absolute value of b* value is about less than 2.5, and more preferably, an absolute value of a* value is less than 1.5 and an absolute value of b* value is about less than 1.5.

1.1.4. Content of Dye

In the ink composition of the present embodiment, a total amount of solid contents of the dyes is preferably 6.8% by mass or less, more preferably 6.0% by mass or less, and even more preferably 5.0% by mass or less, with respect to the total amount of the ink composition. Thereby, a clogging recovery ability can be improved. Furthermore, graininess of the obtained image can be further suppressed, and an image having a neutral hue can be formed.

Furthermore, the total amount of solid contents of the dyes is preferably 0.5% by mass or more and is more preferably 1.0% by mass or more with respect to the total amount of the ink composition.

1.1.5. Other Components Other than Dyes

1.1.5. (1) Alkanolamine

The ink composition may further contain an alkanolamine having 3 or more carbon atoms. Examples of the alkanolamines include, but are not limited to, mono-, di-, or tri-C1-C4 alkanolamines such as diethanolamine, triethanolamine, monoisopropanolamine, diisopropanolamine, and triisopropanolamine. The number of carbon atoms of an alkanolamine is the total number of carbon atoms. Among them, trialkanolamine having a hydroxyalkyl group having 3 or more carbon atoms is more preferable from the viewpoint of improving storage stability of the ink composition. Examples of such alkanolamines include triisopropanolamine.

When the ink composition contains an alkanolamine, it is easy to obtain an image having a more neutral hue. Furthermore, the ink composition may contain a plurality of kinds of alkanolamines. Furthermore, when the ink composition contains an alkanolamine, it is more preferable that a total content of the alkanolamine and the content of the first dye satisfy the relationship of Expression (1).

$$0.1 < (\text{content of alkanolamine})/(\text{content of first dye}) < 0.6 \quad (1)$$

Accordingly, it is possible to form an image having a more neutral hue.

1.1.5. (2) Organic Acid

The ink composition may contain an organic acid. Examples of the organic acid include, but are not limited to, formic acid, acetic acid, propionic acid, butyric acid, lactic acid, malic acid, malonic acid, citric acid, succinic acid, and adipic acid.

When the ink composition contains an organic acid, it is easy to obtain an image having a more neutral hue. The ink composition may contain a plurality of kinds of organic acids. Furthermore, when the ink composition contains an organic acid, a total content of the organic acid and the content of the first dye may satisfy the relationship of Expression (2).

$$0.01 < (\text{content of organic acid})/(\text{content of first dye}) < 0.1 \quad (2)$$

Accordingly, it is possible to form an image having a more neutral hue.

1.1.5. (3) Other Components

The ink composition of the present embodiment may contain a surfactant, an organic solvent, and other components.

1) Surfactant

A surfactant may be added to the ink composition. The surfactant has a function of lowering surface tension of the ink composition and increasing permeability with respect to a recording medium. Examples of the surfactant include nonionic surfactants, anionic surfactants, cationic surfactants, and amphoteric surfactants, and at least one of them can be used.

When the surfactant is added to the ink composition, a content of the surfactant is 0.01% by mass or more and 3.00% by mass or less with respect to the total mass of the ink composition. The content of the surfactant is preferably 0.05% by mass or more and 2.00% by mass or less, more preferably 0.10% by mass or more and 1.00% by mass or less, and even more preferably 0.20% by mass or more and 0.50% by mass or less. By setting the content of the surfactant within the above-mentioned range, it is possible to inhibit foaming, thereby ensuring ejection stability during printing, and to improve wet spread (wettability) of the ink composition when it adheres to a recording medium.

As a nonionic surfactant, it is possible to use an acetylene glycol-based surfactant, a fluorine-based surfactant, a silicone-based surfactant, or the like. By using these surfactants, wettability with respect to a recording medium can be improved with a relatively small content.

The acetylene glycol-based surfactant is not particularly limited, but examples thereof include 2,4,7,9-tetramethyl-5-decine-4,7-diol, an alkylene oxide adduct of 2,4,7,9-tetramethyl-5-decine-4,7-diol, 2,4-dimethyl-5-decin-4-ol, an alkylene oxide adduct of 2,4-dimethyl-5-decin-4-ol, and alkylene oxide adducts such as 3,6-dimethyl-4-octyne-3,6-diol, 3,5-dimethyl-1-hexyn-3-ol, and 2,4-dimethyl-5-hexyn-3-ol.

As such an acetylene glycol-based surfactant, a commercially available product may be used. Examples thereof include Surfynol (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, Air Products and Chemicals, Inc.); OLFINE (registered trademark) B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (trade names, Nissin Chemical Co., Ltd.); and ACETYLENOL (registered trademark) E00, E00P, E40, and E100 (trade names, Kawaken Fine Chemicals Co., Ltd.).

As the fluorine-based surfactant, a commercially available product can be adopted. Examples thereof include MEGAFACE (registered trademark) F-479 (trade name, DIC Corporation) and BYK-340 (trade name, BYK).

The silicone-based surfactant is not particularly limited, but a polysiloxane compound can be adopted. The polysiloxane compound is not particularly limited, and examples thereof include polyether-modified organosiloxane. Examples of commercially available products of the polyether-modified organosiloxane include BYK-302, 306, 307, 333, 341, 345, 346, 347, and 348 (trade names, BYK); and KF-351A, 352A, 353, 354L, 355A, 615A, 945, 640, 642, 643, 6020, 6011, 6012, 6015, 6017, and X-22-4515 (trade names, Shin-Etsu Chemical Co., Ltd.).

Examples of anionic surfactants include higher fatty acid salts, soaps, α-sulfo fatty acid methyl ester salts, alkylbenzene sulfonic acid salts, alkyl sulfate ester salts, alkyl ether sulfate ester salts, monoalkyl phosphoric acid ester salts, α-olefin sulfonic acid salts, alkylnaphthalene sulfonic acid salts, naphthalene sulfonic acid salts, alkane sulfonic acid salts, polyoxyethylene alkyl ether sulfuric acid salts, sulfosuccinic acid salts, and polyoxyalkylene glycol alkyl ether phosphoric acid ester salts.

Examples of cationic surfactants include quaternary ammonium salt compounds such as alkyltrimethylammonium salt, dialkyldimethylammonium salt, and alkyldimethylbenzylammonium salt; and amine salt compounds such as N-methylbishydroxyethylamine fatty acid ester hydrochloride.

The amphoteric surfactant is not particularly limited, and examples thereof include amino acid compounds such as alkylamino fatty acid salts.

The above-mentioned surfactant may be used alone or may be used in combination of two or more kinds thereof.

2) Organic Solvent

An organic solvent may be added to the ink composition. By adding an organic solvent, it is possible to control physical properties such as viscosity and surface tension, and behavior such as drying and permeation when the ink composition is adhered to a recording medium. Examples of the organic solvent include 2-pyrrolidones, 1,2-alkanediols, polyhydric alcohols, and glycol ethers. These can be used alone or in combination of two or more kinds thereof.

2-Pyrrolidones refer to compounds having a 2-pyrrolidone skeleton. As the 2-pyrrolidones, for example, compounds, which have substituents such as N-methyl-2-pyrrolidone, N-ethyl-2-pyrrolidone, and N-vinyl-2-pyrrolidone, are used in addition to 2-pyrrolidone not having a substituent. A substituent in the 2-pyrrolidone skeleton is preferably an organic group having 1 or more and 5 or less carbon atoms, such as a saturated or unsaturated hydrocarbon group. Among them, it is more preferable to use 2-pyrrolidone that is excellent in storage stability of the ink composition and has an excellent effect of inhibiting generation of agglomerates.

When 2-pyrrolidones are added, a content thereof is preferably 0.9% by mass or more and 8.1% by mass or less with respect to a total mass of the ink composition. The content thereof is more preferably 1.0% by mass or more and 8.0% by mass or less. By setting the content of 2-pyrrolidones within the above-mentioned range, it is possible to inhibit an increase in viscosity of the ink composition and improve ejection stability of the ink composition.

Examples of 1,2-alkanediols include 1,2-propanediol, 1,2-butanediol, 1,2-pentanediol, 1,2-hexanediol, and 1,2-octanediol. The 1,2-alkanediols have an excellent effect of increasing wettability of the ink composition with respect to a recording medium for uniform wetting. Therefore, it is possible to produce a printed material in which bleeding is inhibited. When 1,2-alkanediols are added, a content thereof is preferably 1% by mass or more and 20% by mass or less with respect to a total mass of the ink composition.

Examples of polyhydric alcohols include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, and glycerin. By adding polyhydric alcohols to the ink composition, it is possible to inhibit drying and solidification of the ink composition in an ejection nozzle of an ink jet head, and reduce clogging and ejection failure of the ejection nozzle. When polyhydric alcohols are added, a content thereof is preferably 2% by mass or more and 20% by mass or less with respect to a total mass of the ink composition. Polyhydric alcohols that are solid at 20° C. also have the same effect as the polyhydric alcohols of the organic solvent, and therefore may be used in the same manner. Examples of polyhydric alcohols that are solid at 20° C. include trimethylolpropane.

Examples of glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

By adding glycol ethers to the ink composition, wettability and a permeation rate with respect to a recording medium can be adjusted, and thereby an image or a pattern can be clearly formed. When glycol ethers are added, a content thereof is preferably 0.05% by mass or more and 6% by mass or less with respect to a total mass of the ink composition.

For the above-mentioned organic solvent, a plurality of kinds thereof may be mixed and used. In this case, a total content of organic solvents in the ink composition is 0.2% by mass or more and 30.0% by mass or less, preferably 0.4% by mass or more and 20.0% by mass or less, and more preferably 0.5% by mass or more and 15.0% by mass or less, with respect to a total mass of the ink composition. By setting the total content of the organic solvents within the above-mentioned range, it is possible to inhibit an increase in viscosity of the ink composition, adjust behavior (permeation and wet spread) when the ink composition is adhered to a recording medium, and improve ejection stability during printing.

3) Others

Various additives such as pH adjusters, preservatives, antifungal agents, and antioxidants may be added to the ink composition as other components.

Examples of pH adjusters include ureas, morpholine, piperazines, and aminoalcohols. Examples of ureas include urea, ethylene urea, tetramethylurea, thiourea, 1,3-dimethyl-2-imidazolidinone, and the like; and betaines (trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, acetylcarnitine, and the like). By adding a pH adjuster, for example, it is possible to inhibit or promote elution of impurities from a member forming an ink flow path, and adjust detergency of the ink composition. The above-mentioned alkanolamine also has a function as a pH adjuster.

Examples of antifungal agents/preservatives include Proxel CRL, Proxel BDN, Proxel GXL, Proxel XL-2, Proxel IB, and Proxel TN. By adding an antifungal agent/preservative, growth of molds and bacteria can be inhibited, and storage stability of the ink composition is further improved.

1.1.6. Physical Properties, Preparation, and the Like of Ink Composition

A surface tension of the ink composition at 25° C. is preferably 10 mN/m or more and 40 mN/m or less. It is more preferably 20 mN/m or more and 40 mN/m or less, and is even more preferably 20 mN/m or more and 35 mN/m or less. By setting the surface tension at 25° C. within the above-mentioned range, ejection stability of the ink composition from an ejection nozzle is improved when the ink composition is used in the ink jet method. A surface tension of the ink composition can be measured by immersing a part of a platinum plate in the ink composition in an environment of 25° C. using, for example, an automatic surface tension meter CBVP-Z (Kyowa Interface Science Co., Ltd.).

When the ink composition is used in the ink jet method, a viscosity of the ink composition at 20° C. is preferably 2 mPa·s (millipascal seconds) or more and 15 mPa·s or less. It is more preferably 2 mPa·s or more and 10 mPa·s or less, and is even more preferably 3 mPa·s or more and 6 mPa·s or less. The viscosity of the ink composition can be measured using, for example, a viscoelasticity tester MCR-300 (Pysica). Specifically, the viscosity of the ink composition is measured by adjusting a temperature of the ink composition to 20° C., raising a Shear Rate from 10 to 1000, and reading a viscosity when the Shear Rate is 200.

The ink composition of the present embodiment can be prepared by mixing the above-mentioned components in an arbitrary order and performing filtration or the like as necessary to remove impurities, foreign substances, and the like. As a method of mixing each of the components, a method is used, in which materials are sequentially added into a container, which is equipped with a stirring device such as a mechanical stirrer or a magnetic stirrer, and are stirred and mixed. Filtration methods include centrifugal filtration, filter filtration, and the like.

1.2. Other Characteristics of Ink Composition

The ink composition may be characterized in that it contains water, the first dye, and the second dye, and that a content of the first dye is 0.5% by mass or more with respect to a total amount. According to such an ink composition, it is possible to form an image in which granularity is inhibited and ozone fastness is improved and which has a neutral hue.

Furthermore, the ink composition may be an ink composition accommodated in an ink accommodating body to be described later. In this case, the ink composition may be characterized in that it contains water and the first dye, that a content of the first dye is 0.5% by mass or more with respect to a total amount of the ink composition, and that a value of a ratio (A/V) is 1.7 or less where a total surface area of a metal, of the ink accommodating body, in contact with the ink composition is A (cm$^2$) and an accommodation capacity for the ink composition accommodated in the ink accommodating body is V (cm$^3$). In this case, it is possible to form an image in which granularity is inhibited and ozone fastness is improved, and it is possible to improve storage stability.

1.3. Ink Accommodating Body

Hereinafter, an example of the ink accommodating body according to the present embodiment will be described with reference to the drawings. The ink accommodating body of the present embodiment is in the form of a bottle for replenishing, with the ink composition, an ink tank of an ink jet type printer (recording device) that records (prints) an image or the like on a medium by ejecting the ink composition to the medium. Furthermore, in the following description, the ink composition may be simply referred to as the ink.

As shown in FIG. 1, a recording device 21 includes a rectangular parallelepiped housing 22 having the left-right direction as a longitudinal direction. FIG. 1 simply shows a state in which the inside of the housing 22 of the recording device 21 is transparent. A support base 23 having the left-right direction as a longitudinal direction is provided at a lower portion and a rear side in the housing 22 so that an upper surface thereof is aligned substantially in a horizontal direction. A paper P, which is an example of a medium, is transported toward the front, which is a transport direction, while being supported by the upper surface of the support base 23. Furthermore, a guide shaft 24 extending in the left-right direction is transversely installed at an upper position of the support base 23 in the housing 22. A carriage 26, which has, at a lower surface side, a recording head 25 for ejecting the ink, is supported by the guide shaft 24. That is, the carriage 26 is supported so as to be reciprocally movable in the left-right direction with respect to the guide shaft 24 in a state where the guide shaft 24 is inserted into a support hole 27 penetrating in the left-right direction.

Furthermore, a drive pulley 28 and a driven pulley 29 are respectively rotatably supported at positions near both ends of the guide shaft 24 in the housing 22. An output shaft of a carriage motor 30 is connected to the drive pulley 28, and an endless timing belt 31 partially connected to the carriage 26 is wound between the drive pulley 28 and the driven pulley 29. Then, by driving the carriage motor 30, when the carriage 26 is guided by the guide shaft 24 via the timing belt 31 and reciprocates along the left-right direction, which is a scanning direction with respect to the paper P, the ink is ejected to the paper P from the recording head 25 on the lower surface side of the carriage 26 to the paper P, which is transported forward on the support base 23.

Furthermore, as shown in FIG. 1, at a position on the forward side of the support base 23 in the front surface side of the housing 22, a rectangular discharge port 32 is opened to discharge, to the forward side, the paper P on which recording is performed by ejecting the ink from the recording head 25 when the paper P is transported on the support base 23 in the housing 22. The discharge port 32 is provided with a rectangular plate-shaped discharge tray 33 which is capable of supporting the discharged paper P and can move forward in a discharge direction in the housing 22. Furthermore, in the discharge port 32, a paper feed cassette 34 capable of accommodating a plurality of sheets of the paper P used for recording in a stacked state is mounted on the lower side of the discharge tray 33 so as to be freely inserted and removed in a front-rear direction.

Furthermore, as shown in FIG. 1, at a position on the front surface of the housing 22 and on the farther end side (right end side in FIG. 1) in the left-right direction with respect to the discharge port 32, an opening/closing door 35, in which the front surface and the upper surface are rectangular shapes and the right side surface is a right-angled triangle shape, is provided so as to be able to open and close in the front-rear direction with a rotation shaft 36, provided at the lower end thereof along the left-right direction, as the center of rotation. A window portion 37 made of a rectangular transparent member is formed on the front surface of the opening/closing door 35. A user can visually recognize the inside of the housing 22 (particularly, the back side of the front surface of the opening/closing door 35) in a state where the opening/closing door 35 is closed.

In the housing 22 of the recording device 21, an ink supply unit 40 that supplies the ink to the recording head 25 is accommodated at the position on the back side of the opening/closing door 35, that is, the position closer to the front surface and closer to the end (in this case, closer to the right end). The ink supply unit 40 is a structure which includes a plurality of (five in the present embodiment) ink tanks 41 to 45 and can be handled integrally. As will be described later, each of the ink tanks 41 to 45 can be replenished with the ink.

Figure 2:
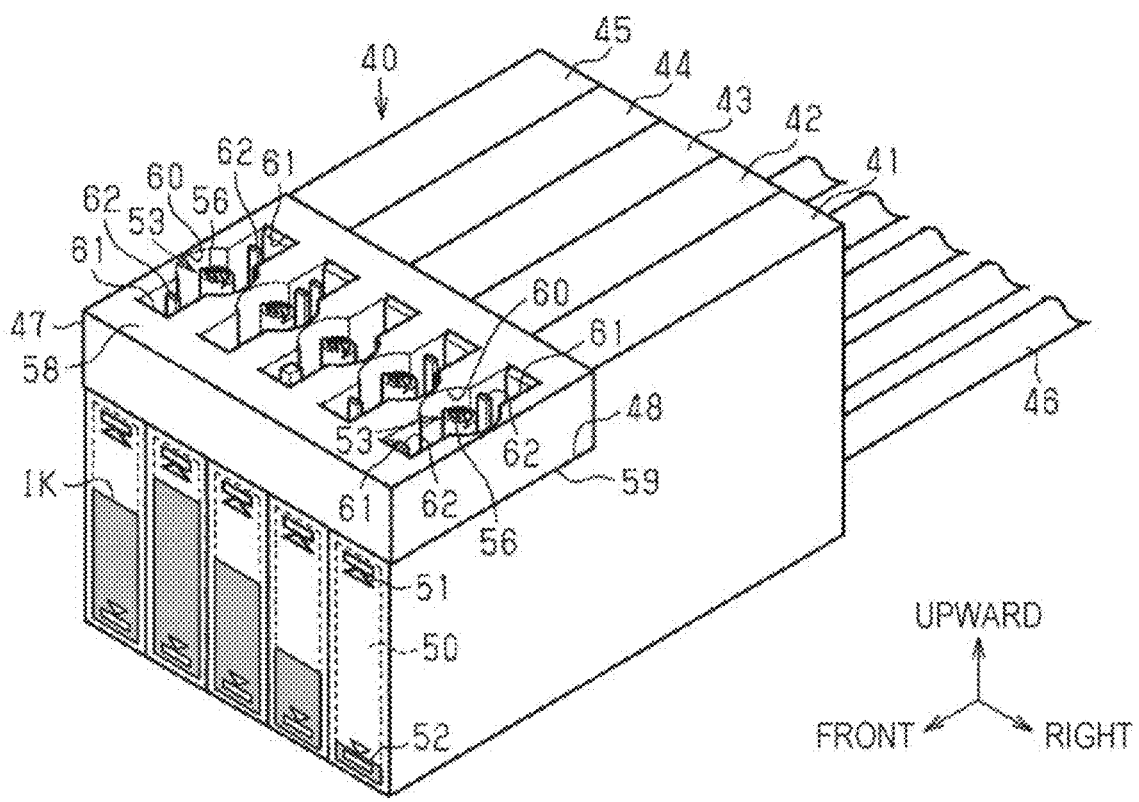
FIG. 2 is a perspective view showing an ink supply unit provided in a housing of the recording device.
Figure 3:
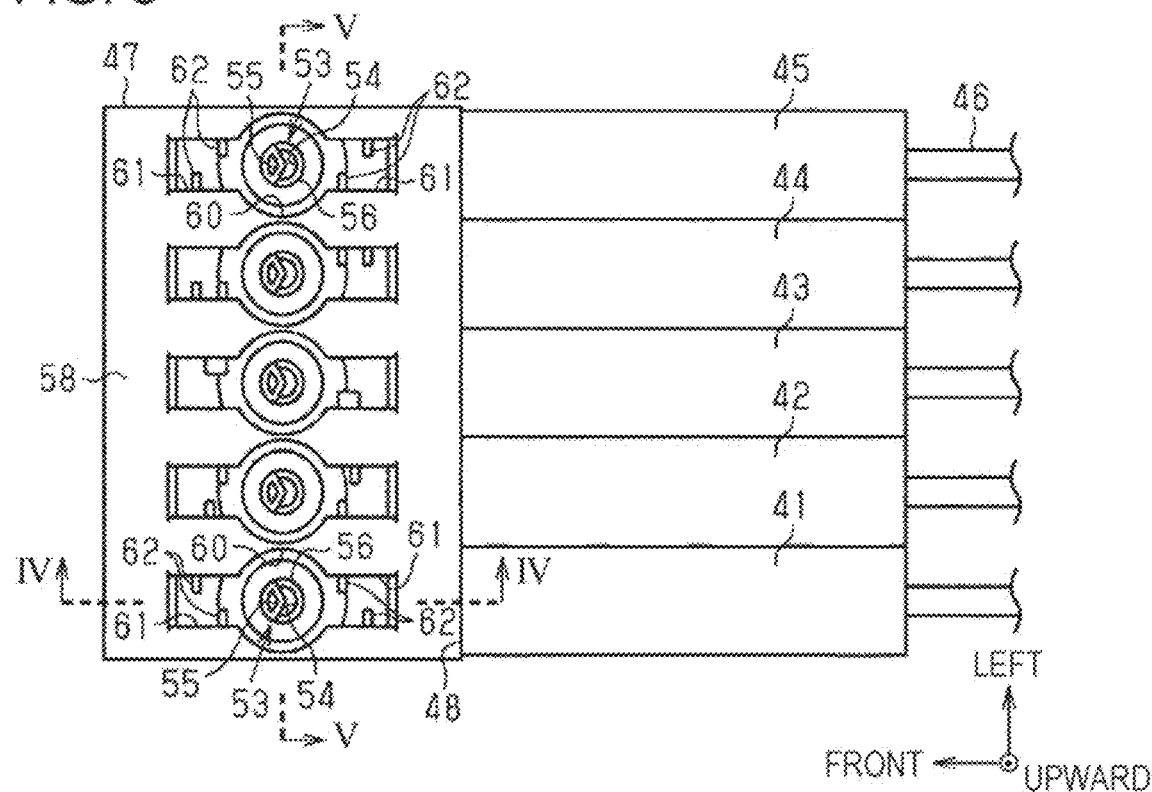
FIG. 3 is a plan view of the ink supply unit.

As shown in FIGS. 2 and 3, the ink supply unit 40 is configured to include the five ink tanks 41 to 45 in the shape of a deformed box that are long in the front-rear direction, five ink supply tubes 46 drawn from the rear surface side of each of the ink tanks 41 to 45, and a rectangular parallelepiped-shaped ink replenishment adapter 47 that can be assembled in a state where the ink tanks 41 to 45 are collectively assembled. The ink replenishment adapter 47 is integrated with the ink tanks 41 to 45 by being assembled to a stepped portion 48 formed in the upper front half of all the ink tanks 41 to 45 in a state where all the ink tanks 41 to 45 are arranged side by side with a thickness direction as the left-right direction. As shown in FIG. 1, the ink supply tubes 46 drawn out from the ink tanks 41 to 45 are coupled to an ink flow path (not shown) formed in the carriage 26, and are coupled to the recording head 25 through the ink flow path. The ink replenishment adapter 47 may form a part of the housing 22 that covers the ink tanks 41 to 45, or may be integrally formed with the ink tanks 41 to 45.

Figure 4:
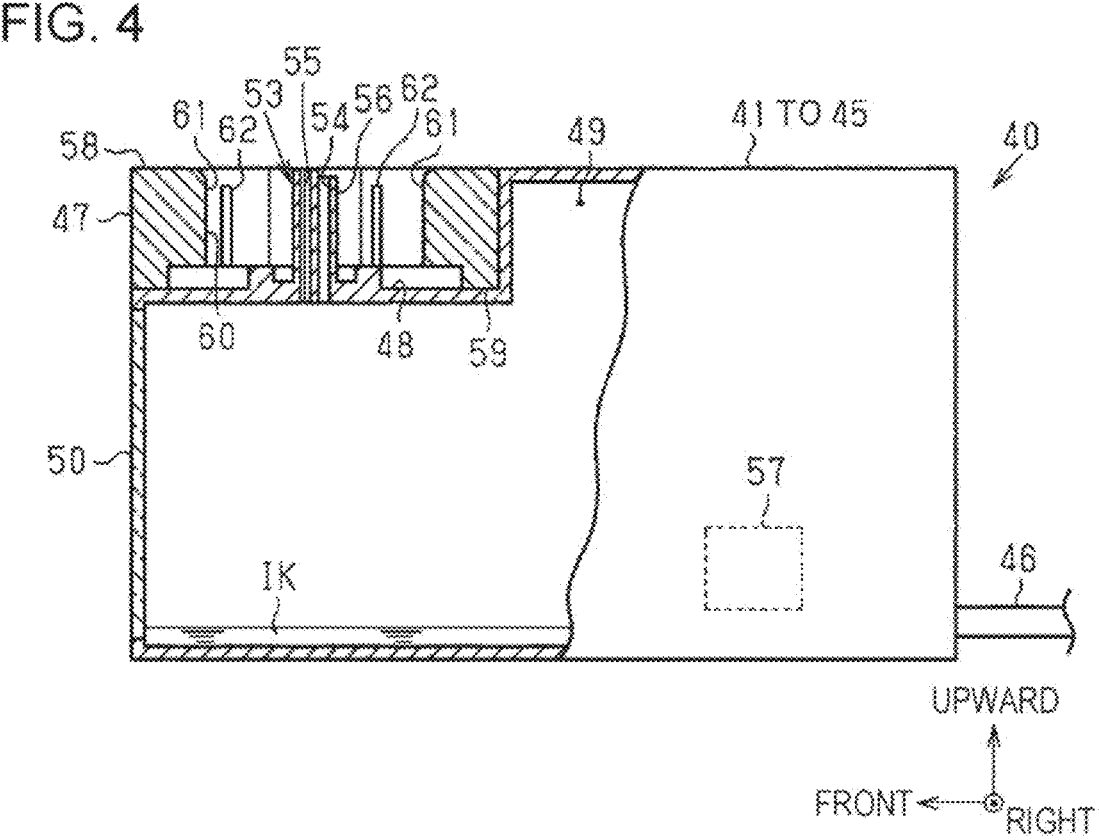
FIG. 4 is a partially cutaway sectional view taken along the line IV-IV in FIG. 3.
Figure 5:
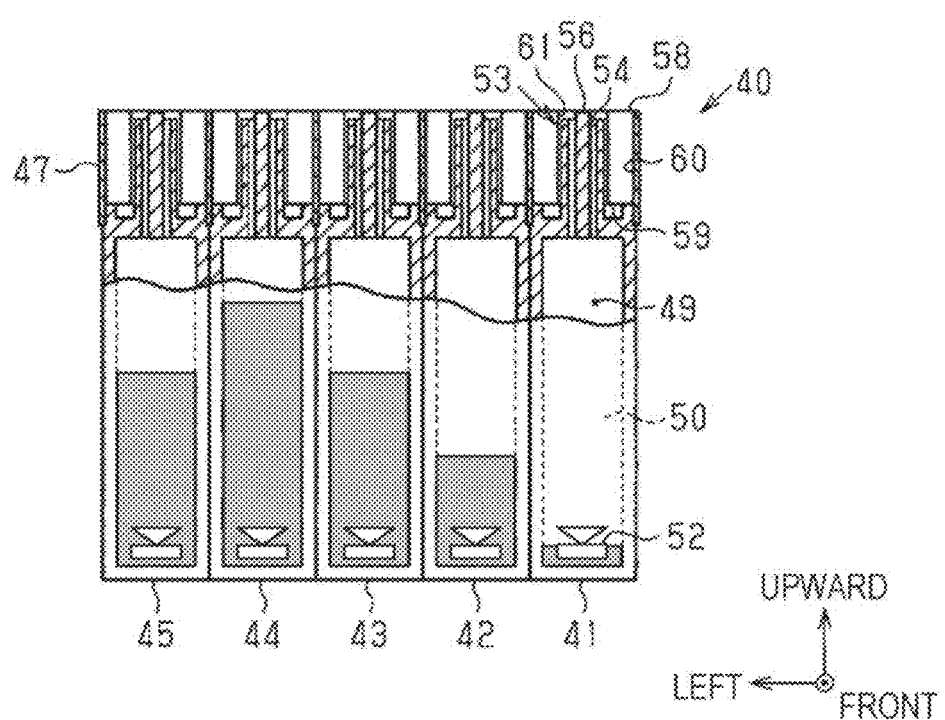
FIG. 5 is a partially cutaway sectional view taken along the line V-V in FIG. 3.

As shown in FIGS. 4 and 5, the ink tanks 41 to 45 have an ink storage chamber 49 capable of storing an ink composition IK inside. In the case of the present embodiment, a black ink is stored in the ink storage chamber 49 of the ink tank 41 located at the right end in the side-by-side direction. Then, color (cyan, magenta, yellow, and the like) inks other than black are stored in the ink storage chambers 49 of the other ink tanks 42 to 45 arranged on the left side of the rightmost ink tank 41 in the side-by-side direction. Furthermore, in the ink tanks 41 to 45, a visual recognition portion 50 formed of a transparent resin is provided at a front wall portion that is visible through a window portion 37 on the front surface of the housing 22, so that the liquid level of the ink composition IK in the ink storage chamber 49 can be visually recognized. Then, at the visual recognition portion 50, provided are an upper limit mark 51 indicating an upper limit guideline for the liquid level of the ink composition IK stored in the ink storage chamber 49 (an example of a guideline for an amount of the ink that can be injected without overflowing an ink inlet 53), and a lower limit mark 52 indicating a lower limit guideline (for example, a guideline for promoting ink replenishment).

As shown in FIG. 4, in the ink tanks 41 to 45, the ink inlet 53 that allows the ink to flow into the ink storage chamber 49 from the outside is provided above a horizontal portion of the stepped portion 48. The ink inlet 53 is configured to include a needle 56 which has flow paths 54 and 55 communicating the inside and the outside of the ink storage chamber 49 and extends vertically upward. The flow paths 54 and 55 of the needle 56 consist of two flow paths 54 and 55 in which the respective tip openings are arranged side by side in the radial direction centered on the needle 56. The flow path 54 (on the right side in FIG. 4) which is one of the two flow paths 54 and 55 has a lower tip opening height and a larger sectional area of the flow path than the flow path 55 (left side in FIG. 4) which is the other one. A remaining amount sensor 57 for detecting a remaining amount of the ink composition IK in the ink storage chamber 49 is provided in the lower portion near the rearward side of the ink storage chamber 49. The remaining amount sensor 57 may not be provided.

As shown in FIGS. 2 to 5, the upper surface 58 of the ink replenishment adapter 47 is a horizontal surface along a direction orthogonal (intersecting) with the extending direction of the needle 56. The through hole 60 that penetrates in the upward and downward direction to a lower surface 59 is formed on the upper surface 58 as an ink inlet forming portion. The through hole 60 consists of a circular hole-shaped ink inlet 53 in which the needle 56 is disposed in the center, and a pair of front and rear rectangular holes that are connected to the front and rear of the ink inlet 53. The lower opening thereof is closed by a horizontal portion of the stepped portion 48 in which the needle 56 is projected upward in the ink tanks 41 to 45.

Therefore, in the through hole 60, in the region outside the ink inlet 53 in the radial direction centered on the ink inlet 53, by a pair of front and rear rectangular holes that block the lower opening, a pair of front and rear recesses 61 that open upward in the extending direction of the needle 56 are formed as recesses with the vertical lower side as the depth direction so as to be point-symmetrical with respect to the ink inlet 53. That is, at the region outside the ink inlet 53 including the needle 56 in the ink replenishment adapter 47 integrated with the ink tanks 41 to 45, a plurality of recesses 61 (in this case, two pairs in the front and rear) forming point-symmetry with the ink inlet 53 as the center are formed. In this case, the tip of the needle 56 disposed at the center of the circular hole-shaped ink inlet 53 is located closer to the ink storage chamber 49 than the upper surface 58 of the ink replenishment adapter 47 which is the opening edge of the through hole 60 including the ink inlet 53 and the recess 61. That is, the upper surface 58 of the ink replenishment adapter 47 extends in the direction in which the needle 56 extends, at a position outside the tip of the needle 56 and in a direction intersecting the direction in which the needle 56 extends. On the other hand, the lower surface 59 of the ink replenishment adapter 47 functions as a tank engagement portion that collectively engages, from above, the plurality of ink tanks 41 to 45 arranged side by side in the left-right direction.

Furthermore, in the upper surface 58 of the ink replenishment adapter 47, the peripheral portion of the upper opening edge of each through hole 60 is colored in a specific color. That is, the color is the same as the color of the ink stored in the ink storage chambers 49 of the ink tanks 41 to 45 into which the ink flows through the ink inlet 53 of the through hole 60. In this respect, the peripheral portion of the upper opening edge of each through hole 60 in the ink replenishment adapter 47 functions as a first portion for showing, to the outside, information related to the ink stored inside the ink tanks 41 to 45 in which the ink inlet 53 of the through hole 60 and the ink storage chamber 49 communicate with each other. Incidentally, the ink stored in the ink tanks 41 to 45 is not particularly limited. However, when the ink tank supplied from the ink accommodating body accommodating the ink composition of the present embodiment is the ink tank 41, it stores black or gray black ink. Therefore, the peripheral portion of the upper opening of the through hole 60 in which the ink inlet 53 communicating with the ink storage chamber 49 of the ink tank 41 is disposed is colored black or gray.

Furthermore, on the inner surface of the recess 61 (specifically, the inner surface along the upward and downward direction), at a position on the bottom surface side (that is, the horizontal portion side of the stepped portion 48) with respect to the upper opening edge of the recess 61, a first uneven portion (first key structure portion) 62 which exhibits a characteristic uneven shape in the horizontal direction is provided so as to extend along the depth direction (in other words, the direction of the central axis of the ink inlet 53) of the recess 61. As shown in FIGS. 2 and 3, the first uneven portion 62 is provided for each ink inlet 53 of the plurality of (five in the present embodiment) ink tanks 41 to 45. Therefore, in the ink replenishment adapter 47, in the rectangular recess 61 in each through hole 60 formed at a position corresponding to each of the ink tanks 41 to 45 in the upward and downward direction, a first uneven portion 62 different from the first uneven portion 62 provided on the inner surface of the recess 61 of the other through hole 60 is formed for each through hole 60. That is, these first uneven portions 62 function as an identification portion that makes it possible to identify the ink accommodating body 63 (refer to FIG. 6 and the like) having the ink outlet 65 (refer to FIG. 6 and the like) coupled to the ink inlet 53 in the through hole 60 in which the first uneven portion 62 is formed. The "position on the bottom surface side of the upper opening edge of the recess 61" means that the position may be slightly recessed toward the bottom surface side of the opening edge.

Therefore, next, the ink accommodating body 63 will be described as an ink replenishment container that constitutes an ink replenishment system together with the ink tanks 41 to 45 and replenishes ink to the ink tanks 41 to 45 having a low ink remaining amount. The ink accommodating body 63 contains the above-mentioned ink composition.

Figure 6:
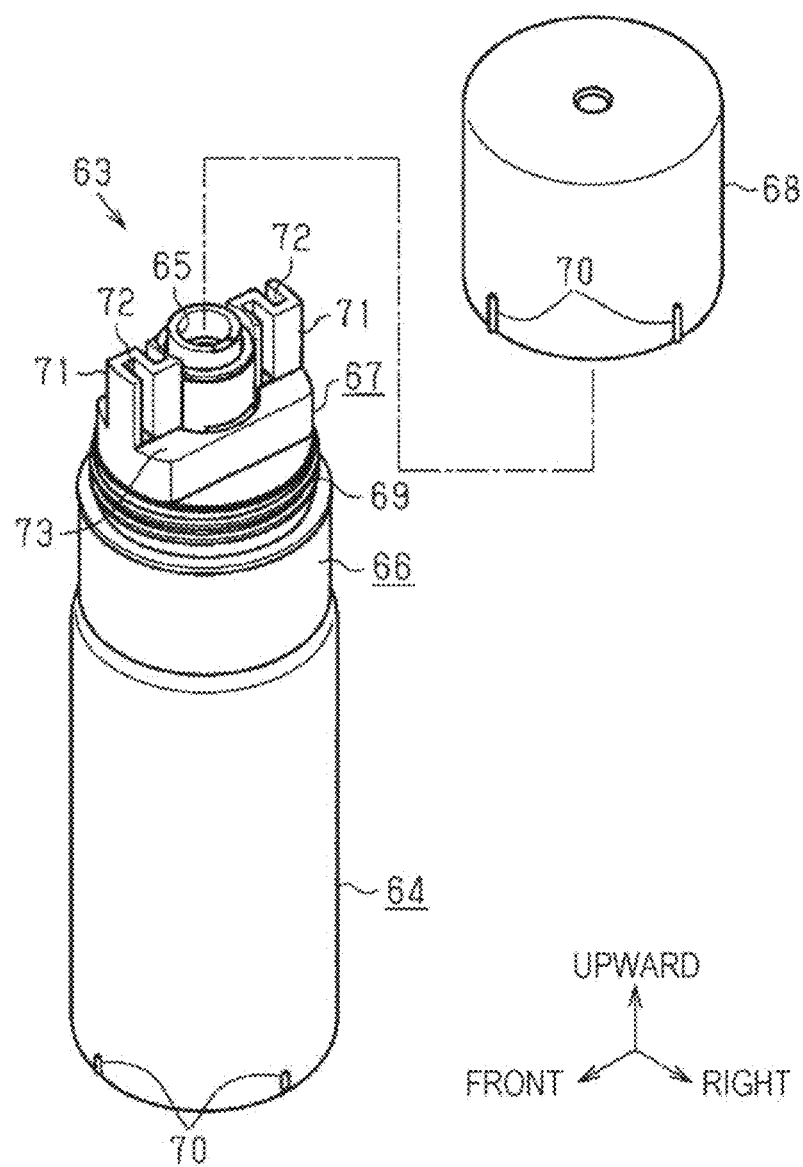
FIG. 6 is a perspective view of an ink accommodating body in a state where a cap is removed.
Figure 7:
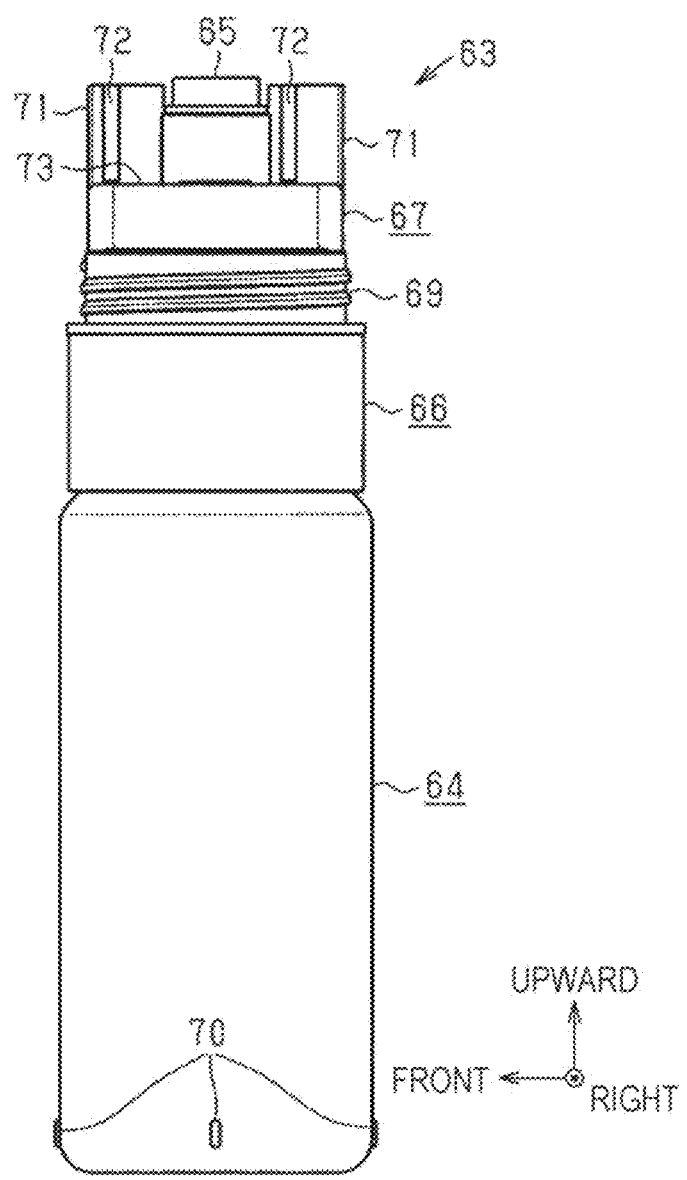
FIG. 7 is a side view of the ink accommodating body.
Figure 8:
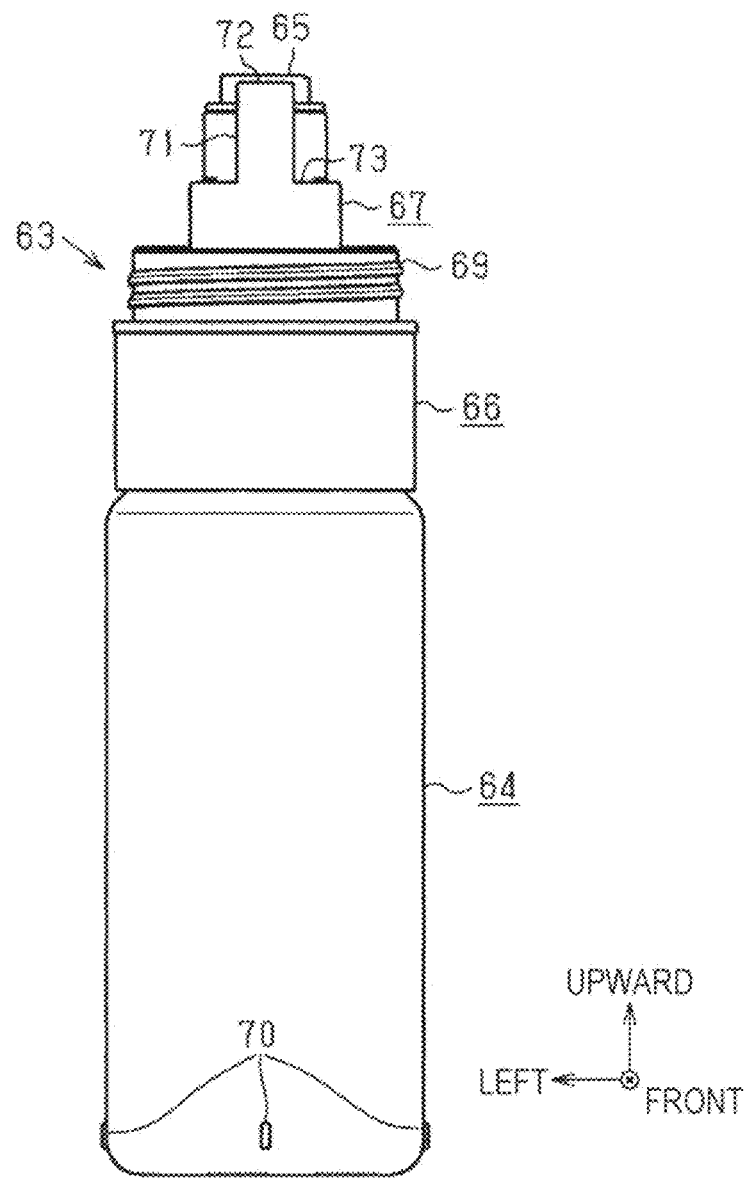
FIG. 8 is a front view of the ink accommodating body.

As shown in FIGS. 6 to 8, the ink accommodating body 63 includes a cylindrical container main body 64 that is the main body; an ink outlet forming portion 66 provided at the tip of the container main body 64 and having an opening formed at the tip of the ink outlet 65 that allows the ink to flow out from the inside of the ink accommodating body 63; and a container addition portion 67 added to the ink outlet forming portion 66 so as to surround the ink outlet 65. The ink outlet 65 of the ink outlet forming portion 66, including the container addition portion 67 around the ink outlet forming portion 66, is covered with a bottomed tubular cap 68, so that the ink outlet 65 is concealed from the outside when the ink accommodating body 63 is stored. That is, a male threaded portion 69 is formed on the outer peripheral surface of the cylindrical lower end portion of the container addition portion 67, while a female threaded portion (not shown) is formed on the inner peripheral surface of the cap 68. By screwing the female threaded portion of the cap 68 into the male threaded portion 69 of the container addition portion 67, the cap 68 is attached to the tip of the ink accommodating body 63 so as to cover the ink outlet 65.

The entire outer surface of the container addition portion 67 is colored in a specific color. That is, the color is the same as the color of the ink accommodated in the container main body 64 to which the container addition portion 67 is added. Incidentally, the outer surface of the container addition portion 67 in the ink accommodating body 63 that houses the black or gray ink is colored black or gray. Furthermore, a plurality of (four in the present embodiment) protrusions 70 are formed on the outer peripheral surfaces of the base end portions of the container main body 64 and the cap 68 at equal angular intervals (for example, 90 degree intervals). Incidentally, these protrusions 70 are formed to prevent the ink accommodating body 63 having a cylindrical shape from rolling. Furthermore, for example, the container main body 64 of the ink accommodating body 63 accommodating a black ink may be formed thicker than the container main body 64 of the ink accommodating body 63 accommodating inks of other colors. In that case, the ink outlet forming portion 66 may have the same thickness and shape as those for black ink and those for inks of other colors.

Furthermore, as shown in FIGS. 6 to 8, in the portion above the cylindrical lower end portion in which the male threaded portion 69 is formed on the outer peripheral surface of the container addition portion 67, in the region outside the ink outlet 65 in the radial direction centered on the ink outlet 65, a projection portion 71 is formed, which projects upward from the ink outlet 65 in the direction of the central axis of the ink outlet 65 in the direction opposite to the container main body 64. When the tip of the needle 56 on the ink inlet 53 side is inserted into the ink outlet 65, the projection portion 71 functions as a second fitting portion that can be fitted using the recess 61 on the upper surface 58 of the ink replenishment adapter 47 as the first fitting portion. Similar to the pair of recesses 61 that sandwich the ink inlet 53 from the front and rear, the projection portion 71 is provided so as to form a pair with the ink outlet 65 sandwiched from the front and rear. As shown in FIGS. 6 and 7, the projection portion 71 is formed in the ink accommodating body 63 in the radial direction centered on the ink outlet 65 and inside the outer peripheral surface of the container main body 64.

Figure 9:
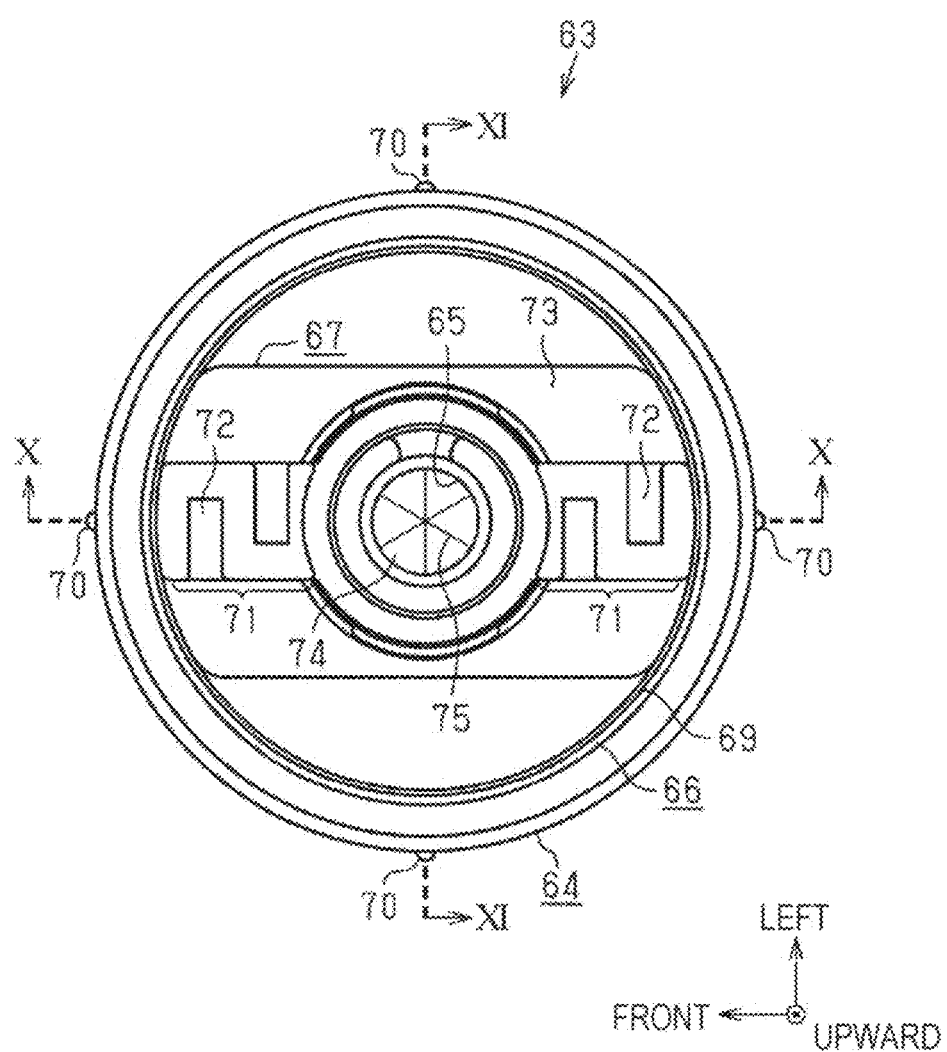
FIG. 9 is a plan view of the ink accommodating body.

As shown in FIGS. 6 and 9, on the outer surface of each projection portion 71 (the left and right side surfaces in FIGS. 6 and 9), a second uneven portion (second key structure portion) 72, which can be engaged with the first uneven portion (first key structure portion) 62 formed on the inner surface of the recess 61 of the ink replenishment adapter 47, is formed. The second uneven portion 72 is provided so as to extend along the protruding direction of the projection portion 71 (in other words, the direction of the central axis of the ink outlet 65). When the projection portion 71 is fitted into the recess 61 and the second uneven portion 72 is engaged with the first uneven portion 62, the ink outlet 65 of the ink accommodating body 63 is coupled to the ink inlet 53 on the ink tanks 41 to 45 side.

Furthermore, between the cylindrical lower end portion on which the male threaded portion 69 of the container addition portion 67 is formed and the projection portion 71 on which the second uneven portion 72 is formed, a planar positioning portion 73 orthogonal (intersecting) with the central axis of the ink outlet 65 is provided so that the planar positioning portion 73 is located at the outside of the radial direction of the ink outlet 65 when the ink outlet 65 is viewed in the direction of its central axis. That is, the positioning portion 73 constitutes a part of the outer surface of the container addition portion 67 which is a part of the outer surface of the ink accommodating body 63, and is provided at a position that is closer to the container main body 64 than the tip of the projection portion 71 in the direction of the central axis of the ink outlet 65. Since the positioning portion 73 is provided in the container addition portion 67 added to the ink outlet forming portion 66 in the ink accommodating body 63, it can be said that it has a configuration different from that of the ink outlet forming portion 66, and a configuration of being provided on the outside of the ink outlet forming portion 66.

Furthermore, as shown in FIG. 9, in the ink outlet 65 formed in the ink outlet forming portion 66, a valve 74 made of an elastic member such as a silicon film that seals the ink outlet 65 so as to be openable and closable is provided. The valve 74 is provided at a position where the positioning portion 73 is closer to the container main body 64 in the direction of the central axis of the ink outlet 65 (refer to, for example, FIG. 14). The valve 74 is provided with a plurality of slits 75 (three in the present embodiment) intersecting at equal angular intervals (120 degree intervals as an example) with the center as an intersection, and is configured to open the valve by these slit 75 pushing out from the outside to the inside of the ink outlet 65. That is, when the tip of the needle 56 on the ink inlet 53 side is inserted into the ink outlet 65, the normally closed valve 74 is expanded inward by the tip of the needle 56 to open the valve.

Then, at that time, the positioning portion 73 abuts on the upper surface 58 of the ink replenishment adapter 47, in which the through hole 60 including the ink inlet 53 and the recess 61 is formed, at the outside the ink outlet 65 in the radial direction. The positioning portion 73 positions the valve 74 with respect to the ink tanks 41 to 45 in the central axis direction of the ink outlet 65. In this respect, the upper surface 58 of the ink replenishment adapter 47 is a part of the side of the ink tanks 41 to 45, with which the positioning portion 73 of the ink accommodating body 63 comes into contact when the valve 74 of the ink outlet 65 of the ink accommodating body 63 is opened to replenish the ink tanks 41 to 45 with ink, and functions as a receiving surface for receiving the planar positioning portion 73.

Figure 10:
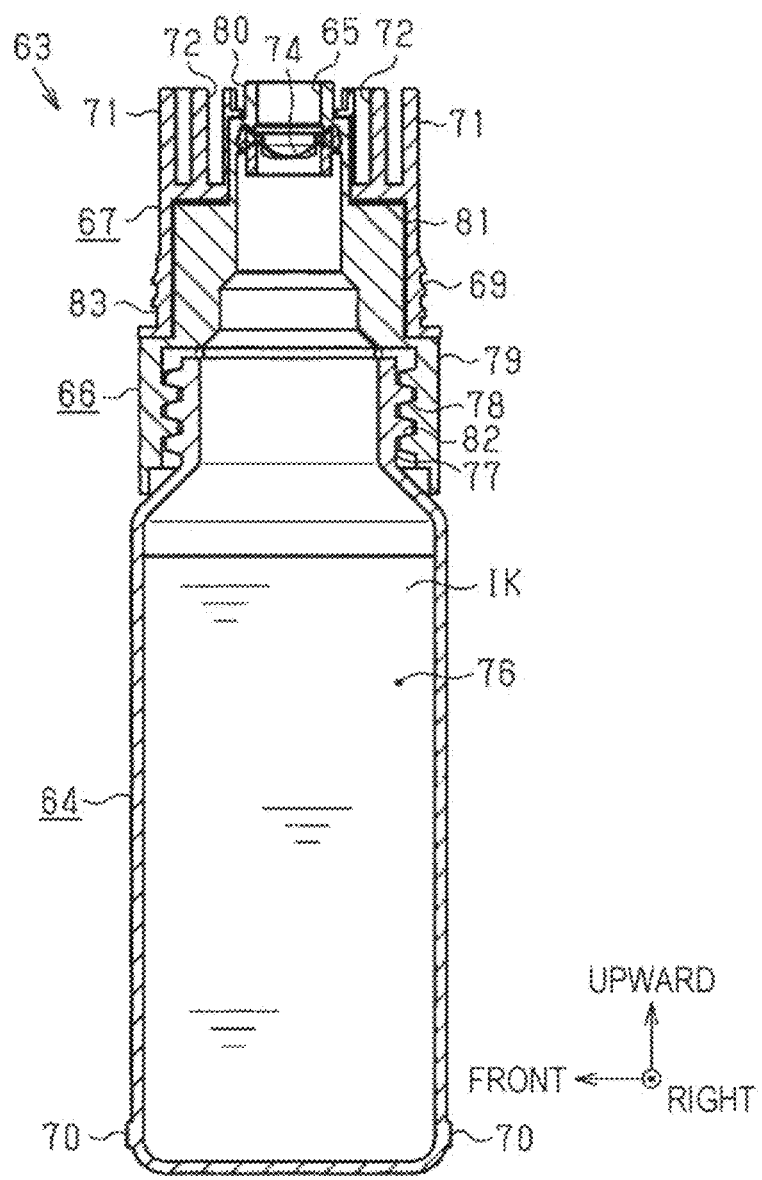
FIG. 10 is a sectional view taken along the line X-X in FIG. 9.
Figure 11:
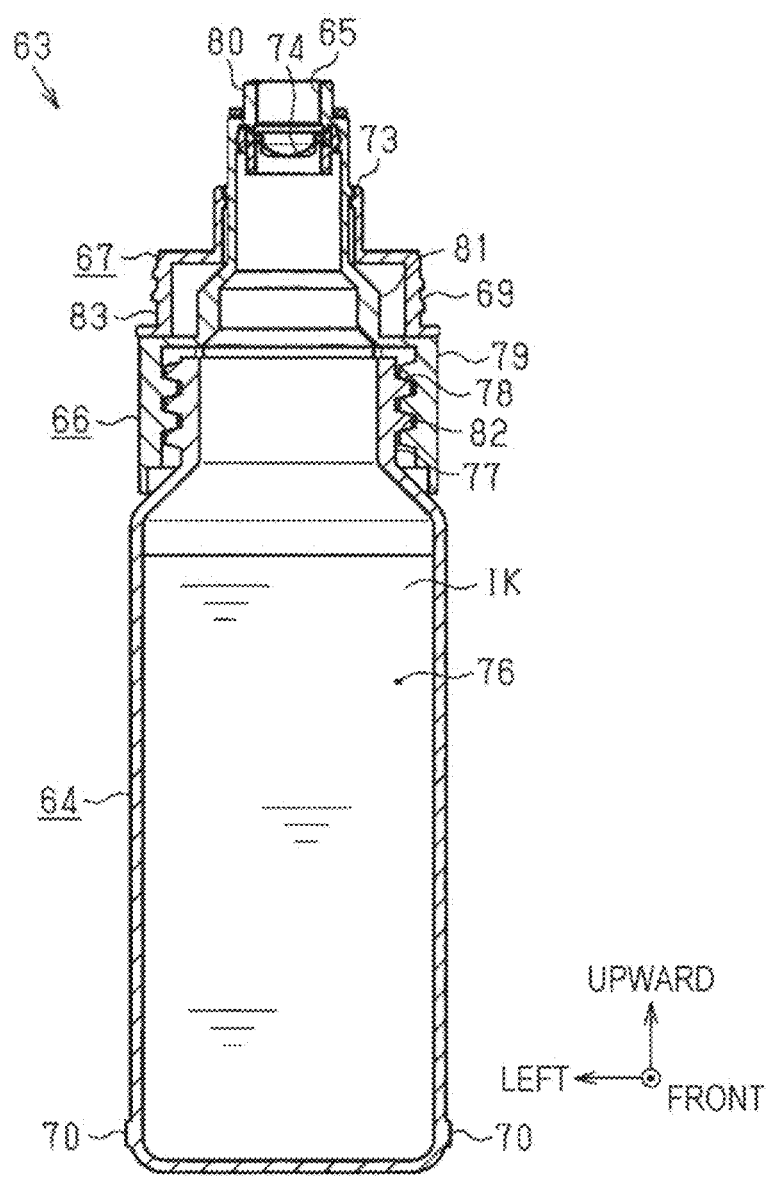
FIG. 11 is a sectional view taken along the line XI-XI in FIG. 9.

As shown in FIGS. 10 and 11, the container main body 64 in the ink accommodating body 63 is a bottle-shaped member having an ink storage chamber 76 capable of accommodating the ink composition IK inside, and a male threaded portion 78 is formed on the outer peripheral surface of a neck portion 77 of the upper end thereof. Meanwhile, the ink outlet forming portion 66 provided at the upper end portion of the container main body 64 has a large diameter portion 79 located on the outer peripheral side of the neck portion 77 of the container main body 64, a small diameter portion 80 that forms an ink outlet 65 at a position farthest from the container main body 64, and an intermediate portion 81 that connects between the large diameter portion 79 and the small diameter portion 80. Then, the female threaded portion 82 formed on the inner peripheral surface of the large diameter portion 79 is screwed into the male threaded portion 78 formed on the outer peripheral surface of the neck portion 77 of the container main body 64. Thereby, the ink outlet forming portion 66 is attached to the upper end portion of the container main body 64.

Furthermore, in the container addition portion 67 added to the ink outlet forming portion 66 of the ink accommodating body 63 so as to surround the ink outlet 65, a cylindrical lower end portion, which has the male threaded portion 69 formed on the outer peripheral surface thereof, configures a joint portion 83 in which the lower end surface thereof is joined to the upper end surface of the large diameter portion 79 of the ink outlet forming portion 66. In the joint portion 83, surface regions of the inner peripheral surface facing each other in the front-rear direction are joined to the large diameter portion 79 of the ink outlet forming portion 66 by the surface region being in surface contact with the front outer surface and the rear outer surface of the intermediate portion 81 of the ink outlet forming portion 66.

Next, the operation of the ink replenishment system configured as described above will be described below, while focusing on the operation of replenishing the ink tanks 41 to 45 of the ink supply unit 40 using the ink accommodating body 63.

As a premise, as shown in FIG. 2, the liquid level height of the ink in the ink tank 41, of a black ink, located on the rightmost side of the plurality of the ink tanks 41 to 45, which are arranged side by side, is dropped to the height of the lower limit mark 52 marked on the lower portion of the visual recognition portion 50. Therefore, in the following description, a case in which an ink is replenished to the ink tank 41 will be described.

Furthermore, it is assumed that the black ink is sufficiently accommodated in the ink accommodating body 63 used for ink replenishment, and the cap 68 is removed from the ink accommodating body 63 in advance. Furthermore, the shape of the second uneven portion 72 formed on the outer surface of the projection portion 71 of the ink accommodating body 63 matches the shape of the first uneven portion 62 formed on the inner surface of the recess 61 located before and after the ink inlet 53 to the ink tank 41. The projection portion 71 can be engaged with the insertion of the projection portion 71 into the recess 61.

When replenishing the ink tank 41 with an ink, a user first rotates the opening/closing door 35 of the housing 22 forward about the rotation shaft 36 from a closed state shown in FIG. 1 to an open state. Then, in the ink supply unit 40, the upper surface 58 of the ink replenishment adapter 47 in which the ink inlet 53 is formed into the ink tanks 41 to 45 is exposed to the outside of the housing 22. The user can couple the ink outlet 65 of the ink accommodating body 63 to the desired ink inlet 53 from above.

Figure 12:
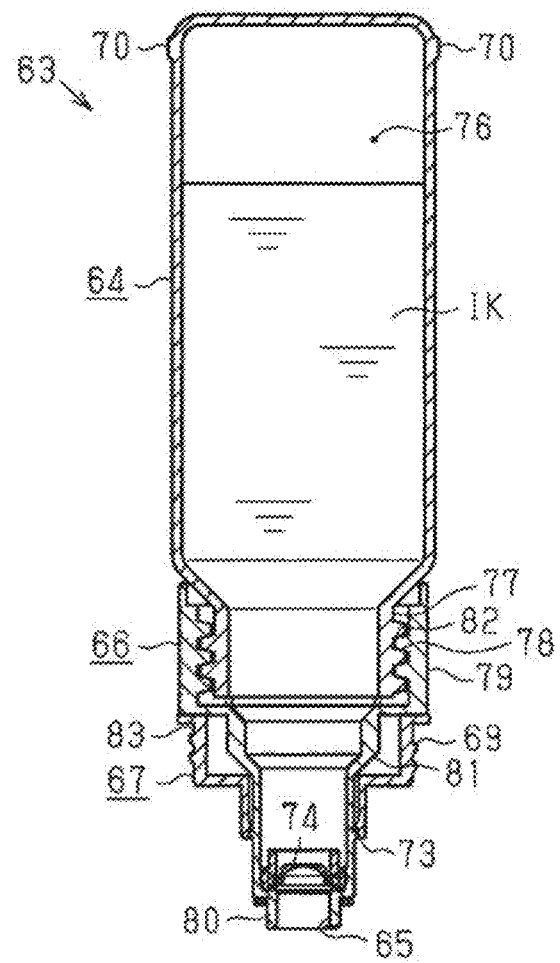
FIG. 12 is a partially cutaway front view showing a state immediately before an ink replenishment operation on an ink tank.
Figure 12:
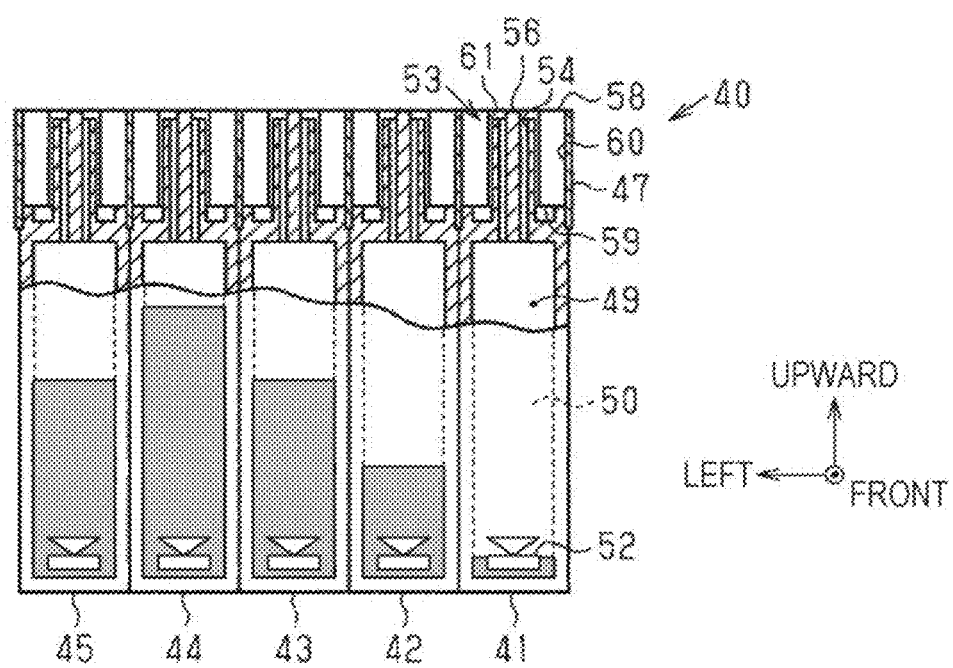
Figure 13:
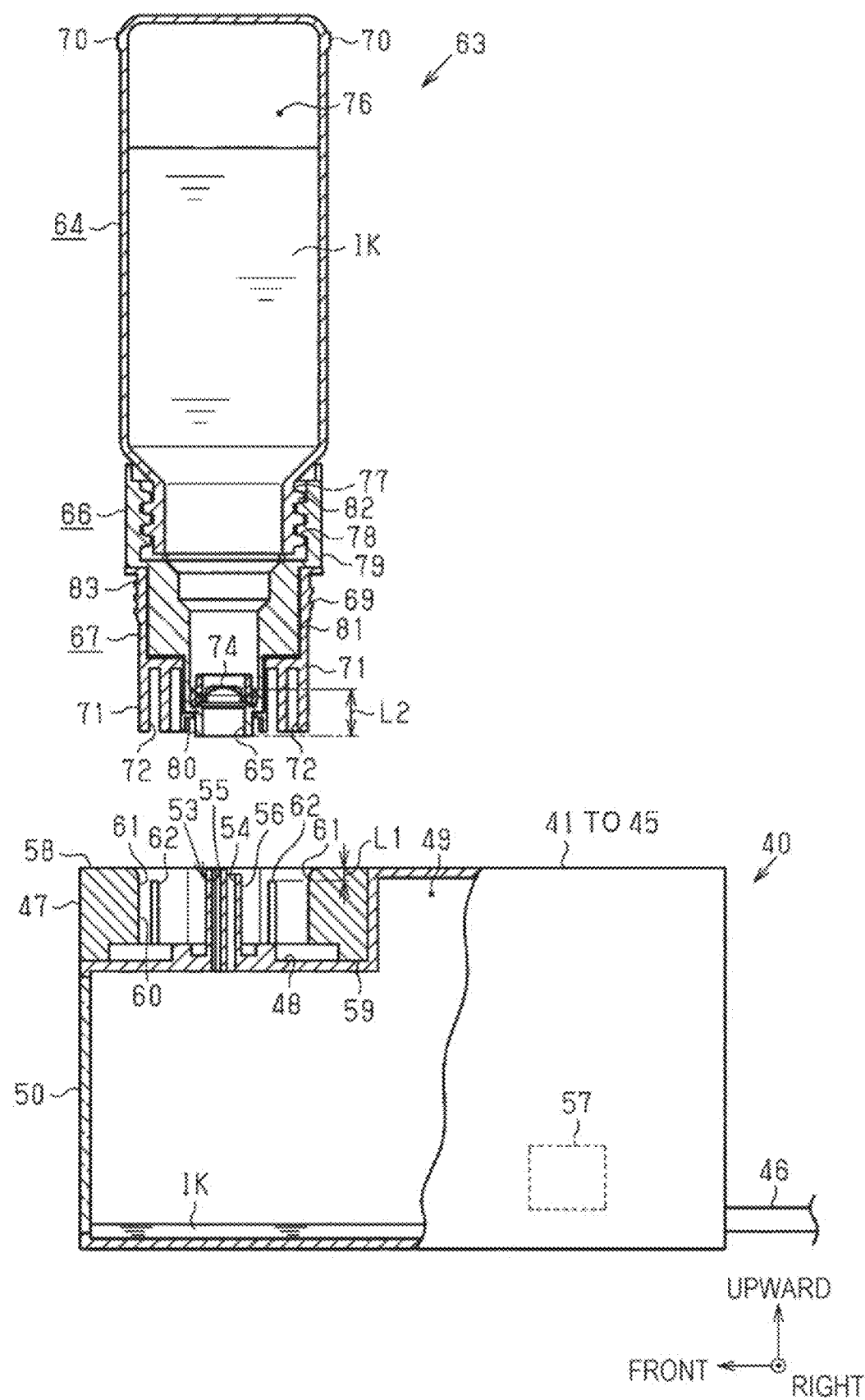
FIG. 13 is a partially cutaway side view showing a state immediately before the ink replenishment operation on the ink tank.

Therefore, as shown in FIGS. 12 and 13, the user turns the ink accommodating body 63 accommodating the ink composition used for ink replenishment upside down, and maintains it so that the ink outlet 65 is located above the rightmost through hole 60 in the ink replenishment adapter 47. That is, a position of the central axis of the ink outlet 65 of the ink accommodating body 63 is aligned with the central axis of the ink inlet 53 of the ink tank 41 to be replenished with ink. At this time, the user can see and compare between a color (second part) colored in the container addition portion 67 of the ink accommodating body 63 held in the hand, and a color (first part) around the upper opening edge of the through hole 60 provided with the ink inlet 53 of the ink tank 41 to be replenished with ink at that time. Then, when the respective colors are the same (in this case, blacks), it is confirmed that the ink accommodating body 63 suitable for the current ink replenishment is held in the hand, and the subsequent work in the ink replenishment is started.

Then, the ink accommodating body 63 is lowered from the state shown in FIGS. 12 and 13. The projection portion 71 of the ink accommodating body 63 is inserted into the recess 61 of the ink replenishment adapter 47 integrated with the ink tank 41. Then, by realizing the state in which the projection portion 71 is inserted into the recess 61, a state in which the central axis of the ink outlet 65 matches with the central axis of the ink inlet 53 is ensured. In this case, since the recess 61 is in a position that is point-symmetrical with respect to the needle 56 which is the center of the ink inlet 53, the projection portion 71 can be inserted into any of the recesses 61. Therefore, it is not necessary to rotate the ink accommodating body 63 many times around the central axis of the ink outlet 65 to confirm the conforming positional relationship between the recess 61 and the projection portion 71, and a user can easily insert the projection portion 71 into the recess 61.

However, at this point, even when the projection portion 71 is slightly inserted into the recess 61, the tip of the needle 56 located at the center of the ink inlet 53 is also inserted into the opening of the ink outlet 65 slightly protruding from the tip of the projection portion 71, but the does not reach the valve 74 located in the inner part of the ink outlet 65. The reason is because, as shown in FIG. 13, a distance L2 between the tip of the projection portion 71 and the valve 74 in the ink outlet 65 is longer than a distance L1 between the upper surface 58 of the ink replenishment adapter 47 where the opening edge of the recess 61 is located, and the upper end of the first uneven portion 62 in the recess 61. Therefore, when the projection portion 71 is further inserted downward in the depth direction of the recess 61 from that state, the second uneven portion 72 on the outer surface of the projection portion 71 engages with the first uneven portion 62 on the inner surface of the recess 61. Then, while maintaining the engaged state, when the projection portion 71 is further inserted toward the bottom surface side in the depth direction of the recess 61, the tip of the needle 56 of the ink inlet 53 reaches the position of the valve 74 of the ink outlet 65, and the valve 74 is opened.

Figure 14:
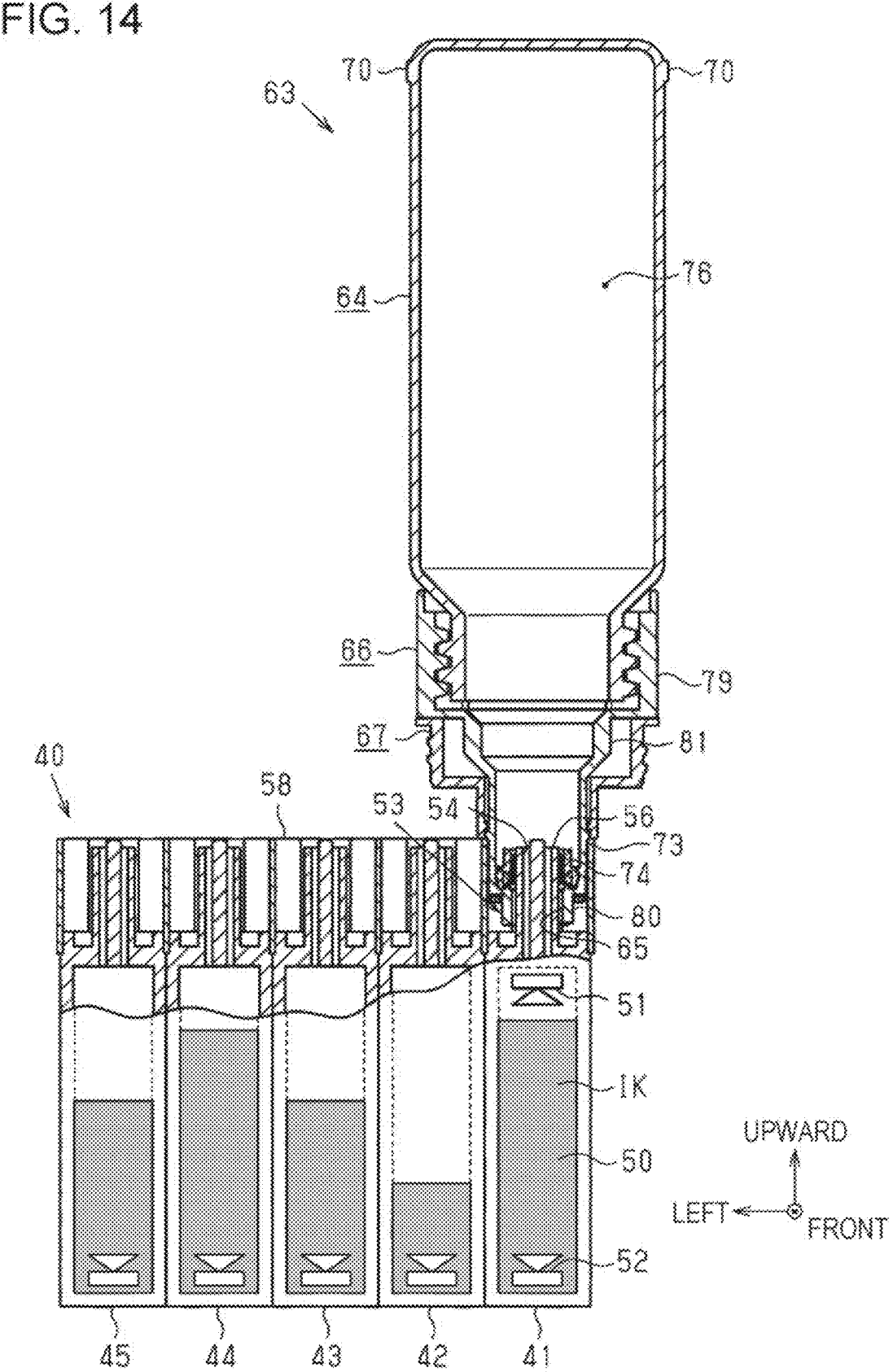
FIG. 14 is a partially cutaway front view showing a state during the ink replenishment operation on the ink tank.
Figure 15:
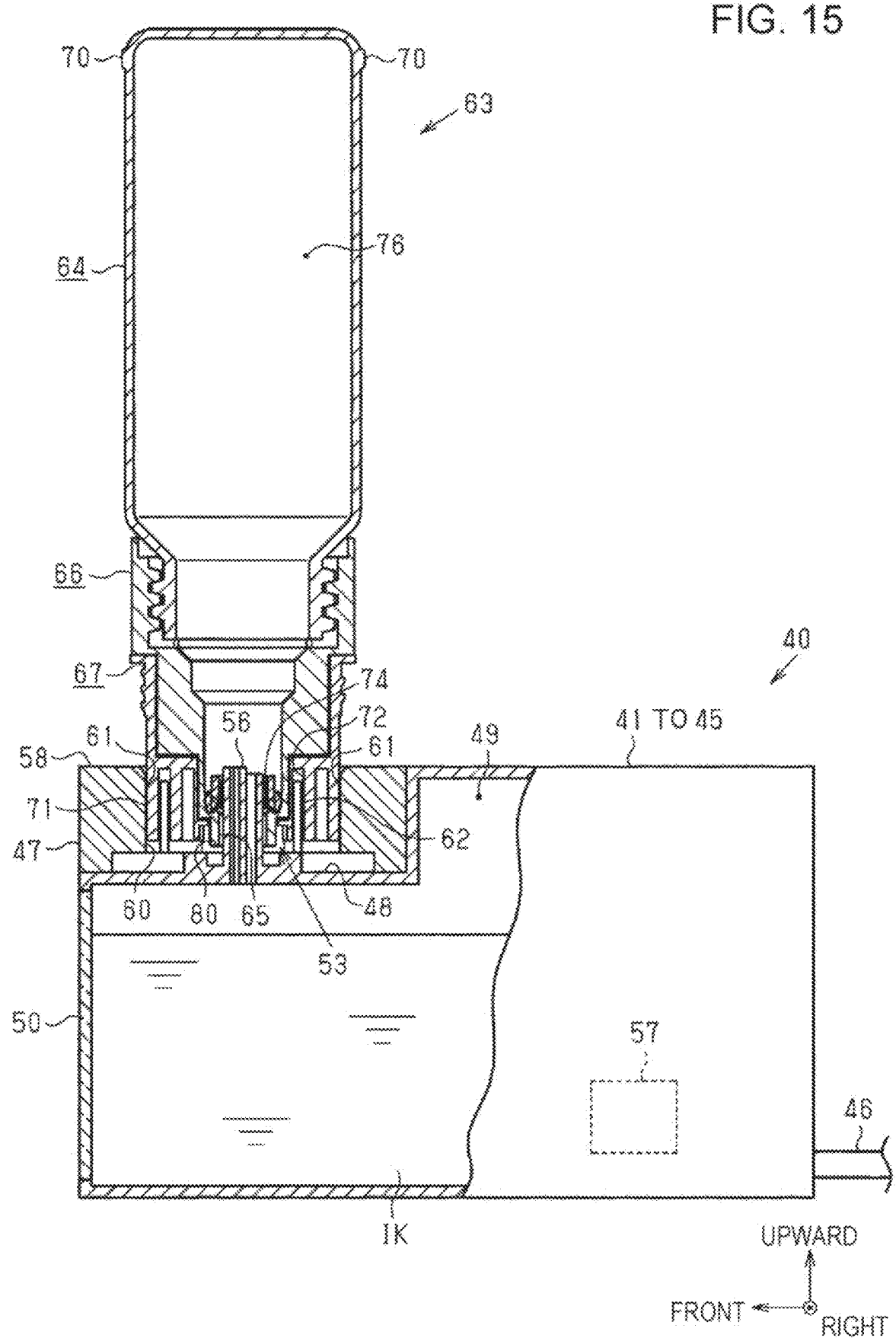
FIG. 15 is a partially cutaway side view showing a state during the ink replenishment operation on the ink tank.

That is, as shown in FIGS. 14 and 15, the tip of the needle 56 pushes the slit 75 upward from below (that is, from the outside to the inside of the ink outlet 65) with respect to the valve 74, and thereby the valve 74 becomes an opened state. As a result, the ink outlet 65 of the ink accommodating body 63 and the needle 56 of the ink inlet 53 of the ink tank 41 are coupled to each other, and the ink composition is replenished from the inside of the ink accommodating body 63 into the ink tank 41. At this time, regarding the needle 56 of the ink inlet 53, among the two flow paths 54 and 55, one of the flow paths, in which the tip opening first touches the ink that has flowed out from the ink outlet 65 by opening the valve 74, functions as an ink flow path for ink circulation, and the other flow path functions as an air flow path through which air flows. For example, when a user tries to couple the ink outlet 65 to the ink inlet 53 with the ink accommodating body 63 tilted, an ink flow path, which serves as an ink flow path of the two flow paths 54 and 55 due to the difference in the tilting direction, also changes.

When the second uneven portion 72 does not engage with the first uneven portion 62 after the projection portion 71 is inserted into the recess 61, at that point, a user can recognize that he/she is mistakenly inserting the ink accommodating body 63 of a color other than black. In this case, when the upper end of the first uneven portion 62 is located at the same height as the opening edge of the recess 61, not only is the engagement of the second uneven portion 72 with the first uneven portion 62 rejected, but insertion of the projection portion 71 with respect to the recess 61 is also rejected. Therefore, the user may try to insert the projection portion 71 into the recess 61 many times, and unnecessarily waste working time. In this respect, in the present embodiment, since the height of the first uneven portion 62 is lower than the opening edge of the recess 61, the projection portion 71 is easily guided to the bottom surface side in the depth direction of the recess 61 when the projection portion 71 is inserted into the recess 61, and a working time is inhibited from being unnecessarily long.

Figure 16:
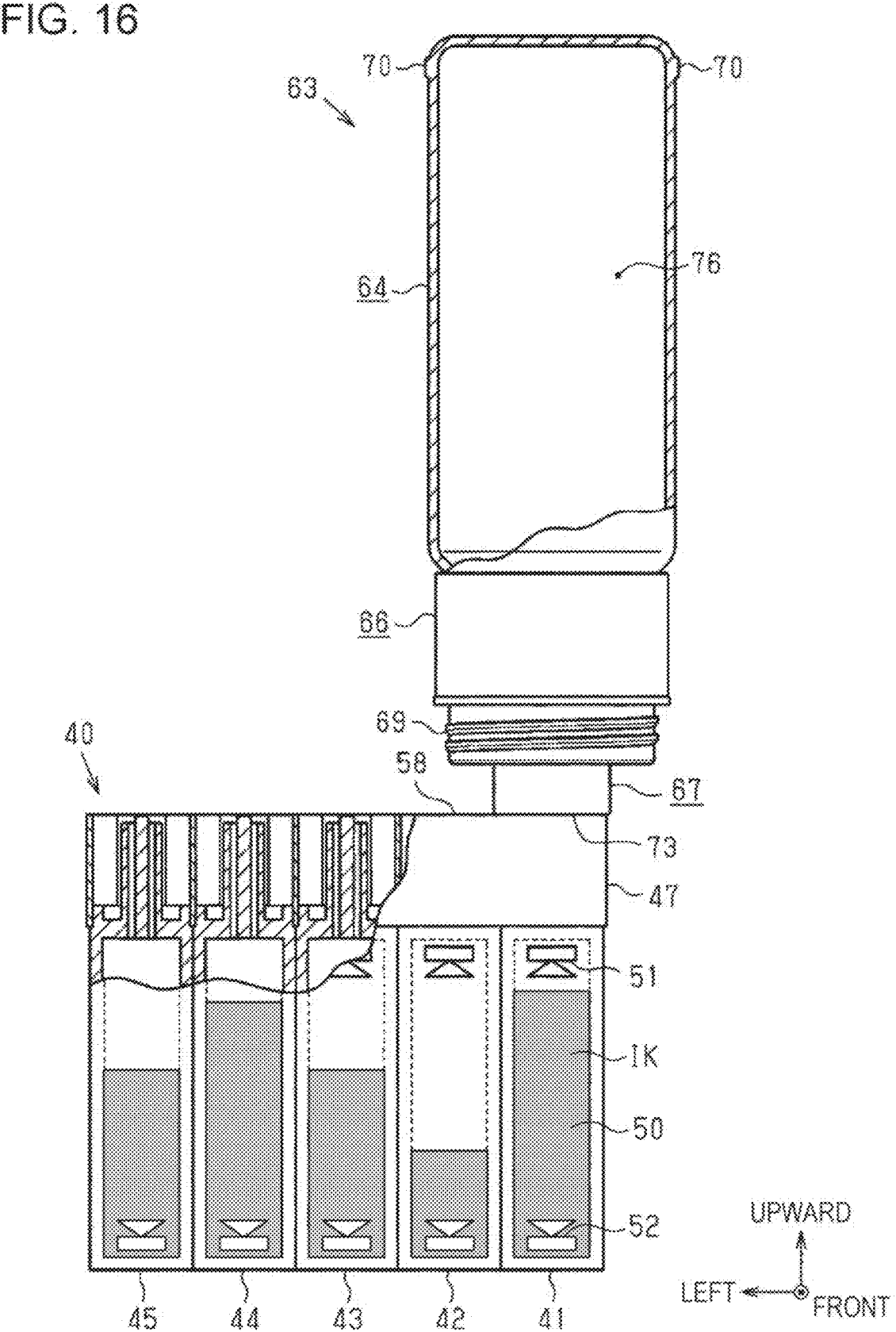
FIG. 16 is a partially cutaway front view showing a state in which a positioning portion of the ink accommodating body abuts a receiving surface of a side of the ink tank during the ink replenishment.
Figure 17:
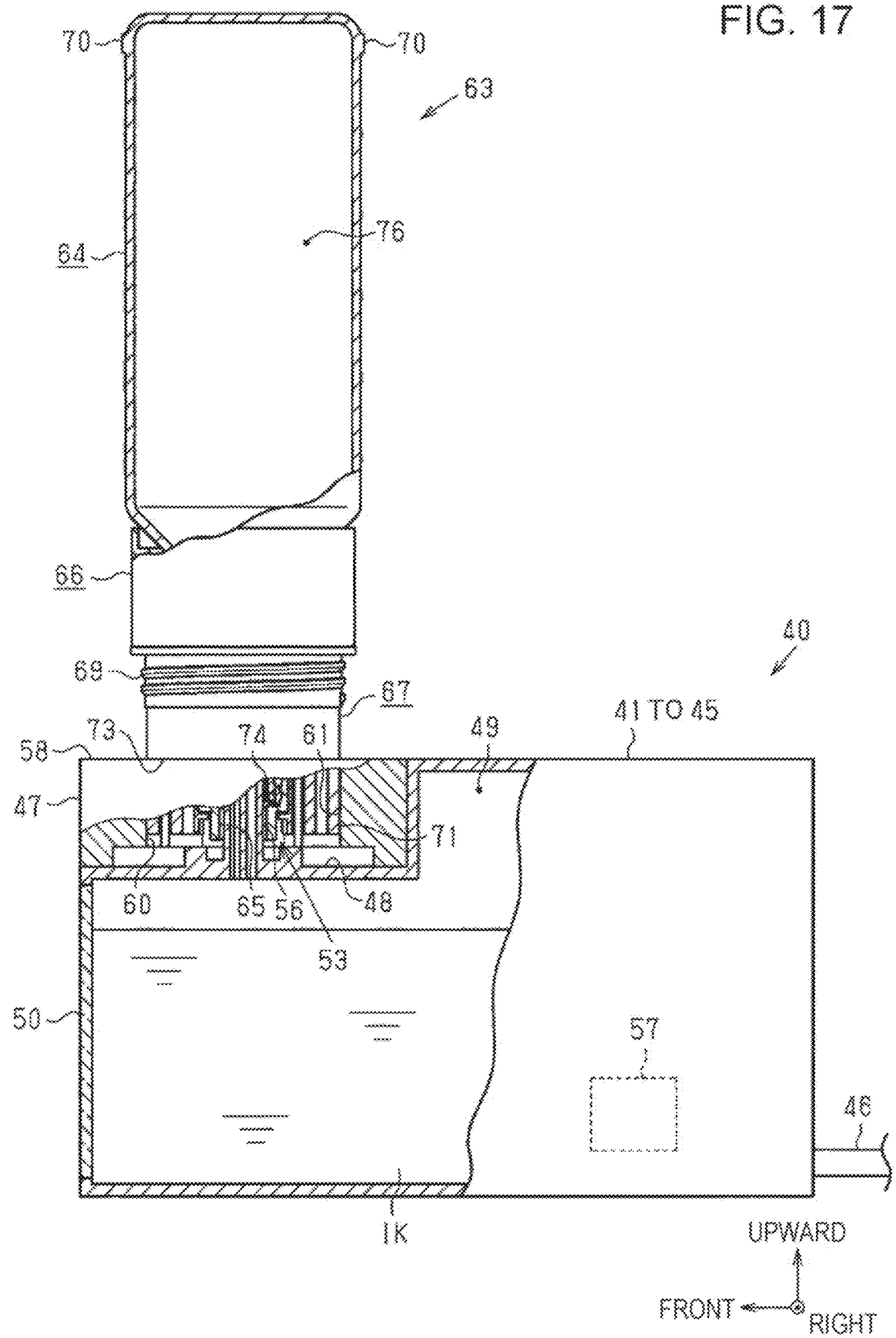
FIG. 17 is a partially cutaway side view showing a state in which the positioning portion of the ink accommodating body abuts the receiving surface of the side of the ink tank during the ink replenishment.

Furthermore, as shown in FIGS. 14, 16 and 17, when the needle 56 of the ink inlet 53 on the ink tank 41 side opens the valve 74 in the ink outlet 65 of the ink accommodating body 63, in the ink accommodating body 63, the positioning portion 73 comes into contact with the upper surface 58 of the ink replenishment adapter 47, which is a part of the ink tank 41 side. That is, in the ink accommodating body 63, by the contact between the positioning portion 73 and the upper surface 58 of the ink replenishment adapter 47, the valve 74 is opened in a state of being positioned in the direction of the central axis of the ink outlet 65 with respect to the needle 56 on the ink tank 41 side.

Furthermore, at that time, since the positioning portion 73 is located outside the ink outlet 65 in the radial direction, the ink accommodating body 63 is stably maintained in the posture in which the ink outlet 65 is coupled to the ink inlet 53. Furthermore, as shown in FIGS. 14 and 15, when the positioning portion 73 of the ink accommodating body 63 comes into contact with the upper surface 58 of the ink replenishment adapter 47, a gap is present between the bottom surface of the ink inlet 53 where the base end of the needle 56 at the ink inlet 53 is located, and the tip of the ink outlet 65 of the ink accommodating body 63. Therefore, ink tends to accumulate on the bottom surface of the ink inlet 53 where the base end of the needle 56 is located, but it is also possible to prevent the accumulated ink from adhering to the tip of the ink outlet 65 and contaminating the ink accommodating body 63.

Then, as shown in FIGS. 14 and 16, when the ink replenishment from the ink accommodating body 63 to the ink tank 41 is completed, and in a case where the liquid level height of the ink in the ink tank 41 is still lower than the upper limit mark 51 of the visual recognition portion 50, the ink accommodating body 63 for the same black may be used to further replenish the ink up to the upper limit mark 51. The ink replenishment operation as described above is also performed for the ink tanks 42 to 45 of colors other than the ink tank 41 of the ink composition (black or gray ink composition).

In the ink accommodating body 63 described above, all the portions that may come into contact with the ink composition are formed of a polymer compound such as polyolefin. That is, the ink accommodating body has a structure in which the portion in contact with the ink composition does not contain a metal.

Accordingly, in the ink accommodating body 63, a value of a ratio (A/V) being 1.7 or less is satisfied, that is, a value of a ratio (A/V) is 0.0, when a total surface area of a metal, of the ink accommodating body 63, in contact with the ink composition is A ($cm^2$) and an accommodation capacity for the ink composition accommodated in the ink accommodating body 63 is V ($cm^3$).

The ink accommodating body 63 is an example in which a value of a ratio (A/V) is 0.0, but the ink accommodating body may have a metal portion in contact with the ink composition as long as a value of a ratio (A/V) is 1.7 or less. Such a portion is, for example, a spring or the like, and may be made of an aluminum alloy or stainless steel. Furthermore, the value of the ratio (A/V) is more preferably 1.0 or less, even more preferably 0.5 or less, and particularly preferably 0.2 or less.

As a result of examination, the inventors of the present disclosure have found that the ink accommodating body affects storage stability of the ink composition. It is presumed that one of the causes of the influence is the contact between the ink composition and the metal in the ink accommodating body. Furthermore, it is thought that, when the value of the ratio (A/V) of the ink accommodating body is 1.7 or less, the frequency of contact of the first dye in the ink composition with the metal is reduced, and thereby a deterioration of the first dye when the ink composition is stored in the ink accommodating body is inhibited.

Furthermore, it is proved by Examples to be described later that storage stability of the first dye can be further improved when the value of the ratio (A/V) is 0.0 as in the ink accommodating body 63 described above.

Furthermore, in the above description, the example of a bottle-shaped ink accommodating body having a relatively high strength has been described, but the ink accommodating body may be formed of a film or the like and easily change in shape. Examples of forms of such an ink accommodating body include a pack and a tube. Even when the ink accommodating body is in the form of a pack or a tube, the same effect can be obtained as long as a value of a ratio (A/V) is 1.7 or less.

Furthermore, in the case of a bottle-shaped ink accommodating body having a relatively high strength as in the case of the ink accommodating body 63 described above, a structure, in which the ink composition is in contact with air while the ink composition is accommodated in the ink accommodating body, is adopted. With such a structure, the ink composition is in contact with air during storage. In this case, it is possible to inhibit the dye contained in the accommodated ink composition from being reduced during storage and deteriorated due to the oxidizing action of oxygen in the air. Even when the ink accommodating body is in the form of a pack or a tube, the ink composition can be stored in a state of being in contact with air, but in this case, a manufacturer or a user stores the ink composition in such a state.

According to this ink accommodating body, the first dye in the accommodated ink composition can be stored in a state where the first dye exhibits good color developability. Furthermore, the ink composition accommodated in this ink accommodating body enables formation of an image having good ozone fastness.

2. Examples and Comparative Examples

Hereinafter, the present disclosure will be specifically described with reference to examples, but the present disclosure is not limited to these examples. Hereinafter, "part" and "%" are based on mass unless otherwise specified. Unless otherwise specified, the subsequent evaluations were carried out in an environment of a temperature of 25° C. and a relative humidity of 40%.

2.1. Preparation of Ink Composition

Compositions of ink compositions of examples and comparative examples are shown in Tables 1 and 2. An ink composition was prepared by mixing components shown in Tables 1 and 2 in an arbitrary order, mixing for 30 minutes or more, and performing filtration or the like as necessary to remove impurities, foreign substances, and the like. As a method of mixing each of the components, materials were sequentially added into a container equipped with a mechanical stirrer, and were stirred and mixed. Thereafter, filter filtration was performed to obtain ink compositions of each example (Examples 1 to 20 and Comparative Examples 1 to 6). The unit of numerical values in Tables 1 and 2 is "% by mass".

TABLE 1

| | | Examples | | | | | | |
|---|---|---|---|---|---|---|---|---|
| | | 1 | 2 | 3 | 4 | 5 | 6 | 7 |
| Formula of dye compound | B-1 | 1.00 | 3.00 | 1.00 | 1.00 | 3.50 | 3.80 | 1.00 |
| | B-2 | — | — | — | — | — | — | — |
| | M-1 | 0.10 | 0.30 | 0.10 | 0.10 | 0.50 | 0.50 | — |
| | M-2 | 0.30 | 0.50 | 0.30 | 0.30 | 1.00 | 1.40 | 0.10 |
| | M-3 | — | — | — | — | — | — | — |
| | Y-1 | 0.30 | 0.80 | 0.30 | 0.30 | 1.00 | 1.10 | 0.30 |
| | Y-2 | — | — | — | — | — | — | — |
| Alkanolamine | Triisopropanolamine | 0.20 | 0.20 | 0.20 | 0.20 | 0.20 | 0.20 | 0.20 |
| | Triethanolamine | — | — | — | — | — | — | — |
| Organic acid | Adipic acid | 0.02 | 0.02 | 0.02 | 0.02 | 0.02 | 0.02 | 0.02 |
| | Water | Remaining amount | Remaining amount | Remaining amount | Remaining amount | Remaining amount | Remaining amount | Remaining amount |
| | pH | 7.80 | 7.80 | 7.80 | 7.80 | 7.80 | 7.80 | 7.80 |
| Amount of solid contents of dyes | | 1.70 | 4.60 | 1.70 | 1.70 | 6.00 | 6.80 | 1.40 |
| Total surface area of metal [cm²] = A | | 0.0 | 0.0 | 19.0 | 12.0 | 0.0 | 0.0 | 0.0 |
| Accommodation capacity for ink [cm³] = V | | 70.0 | 70.0 | 12.0 | 12.0 | 70.0 | 70.0 | 70.0 |
| Ratio (A/V) | | 0.00 | 0.00 | 1.58 | 1.00 | 0.00 | 0.00 | 0.00 |
| Presence or absence of air in ink accommodating body | | Present | Present | Present | Present | Present | Present | Present |
| Storage stability of ink | | S | S | B | A | S | S | S |
| Hue | | S | S | S | S | S | S | A |
| Ozone fastness | | A | S | A | A | S | S | A |
| Clogging recovery ability | | S | A | S | S | A | B | S |

| | | Examples | | | | | |
|---|---|---|---|---|---|---|---|
| | | 8 | 9 | 10 | 11 | 12 | 13 |
| Formula of dye compound | B-1 | 1.00 | 1.00 | 1.00 | 1.00 | 1.00 | 1.00 |
| | B-2 | — | — | — | — | — | — |
| | M-1 | 0.30 | 0.10 | 0.10 | 0.10 | — | 0.10 |
| | M-2 | 0.10 | — | 0.30 | 0.30 | — | 0.30 |
| | M-3 | — | 0.20 | — | — | — | — |
| | Y-1 | 0.30 | 0.30 | 0.10 | — | — | 0.30 |
| | Y-2 | — | — | — | 0.30 | — | — |
| Alkanolamine | Triisopropanolamine | 0.20 | 0.20 | 0.20 | 0.20 | 0.20 | 0.50 |
| | Triethanolamine | — | — | — | — | — | — |

TABLE 1-continued

| | | | | | | | |
|---|---|---|---|---|---|---|---|
| Organic acid | Adipic acid | 0.02 | 0.02 | 0.02 | 0.02 | 0.02 | 0.02 |
| | Water | Remaining amount | Remaining amount | Remaining amount | Remaining amount | Remaining amount | Remaining amount |
| | pH | 7.80 | 7.80 | 7.80 | 7.80 | 7.80 | 8.20 |
| Amount of solid contents of dyes | | 1.70 | 1.60 | 1.70 | 1.70 | 1.70 | 1.70 |
| Total surface area of metal [$cm^2$] = A | | 0.0 | 0.0 | 0.0 | 0.0 | 0.0 | 0.0 |
| Accommodation capacity for ink [$cm^3$] = V | | 70.0 | 70.0 | 70.0 | 70.0 | 70.0 | 70.0 |
| Ratio (A/V) | | 0.00 | 0.00 | 0.00 | 0.00 | 0.00 | 0.00 |
| Presence or absence of air in ink accommodating body | | Present | Present | Present | Present | Present | Present |
| Storage stability of ink | | S | S | S | S | S | B |
| Hue | | A | B | A | B | B | S |
| Ozone fastness | | A | B | A | B | B | A |
| Clogging recovery ability | | S | S | S | S | S | S |

TABLE 2

| | | Examples | | | | | | |
|---|---|---|---|---|---|---|---|---|
| | | 14 | 15 | 16 | 17 | 18 | 19 | 20 |
| Formula of dye compound | B-1 | 1.00 | 1.00 | 1.00 | 1.00 | 1.00 | 1.00 | 1.00 |
| | B-2 | — | — | — | — | — | — | — |
| | M-1 | 0.10 | 0.10 | 0.10 | 0.10 | 0.10 | 0.10 | 0.10 |
| | M-2 | 0.30 | 0.30 | 0.30 | 0.30 | 0.30 | 0.30 | 0.30 |
| | M-3 | — | — | — | — | — | — | — |
| | Y-1 | 0.30 | 0.30 | 0.30 | 0.30 | 0.30 | 0.30 | 0.30 |
| | Y-2 | — | — | — | — | — | — | — |
| Alkanolamine | Triisopropanolamine | 0.70 | — | — | 0.20 | 0.20 | 0.20 | 0.20 |
| | Triethanolamine | — | — | 0.20 | — | — | — | — |
| Organic acid | Adipic acid | 0.02 | 0.02 | 0.02 | 0.05 | — | 0.12 | 0.02 |
| | Water | Remaining amount | Remaining amount | Remaining amount | Remaining amount | Remaining amount | Remaining amount | Remaining amount |
| | pH | 7.80 | 7.80 | 7.80 | 7.80 | 7.80 | 7.80 | 7.80 |
| Amount of solid contents of dyes | | 1.70 | 1.70 | 1.70 | 1.70 | 1.70 | 1.70 | 1.70 |
| Total surface area of metal [$cm^2$] = A | | 0.0 | 0.0 | 0.0 | 0.0 | 0.0 | 0.0 | 0.0 |
| Accommodation capacity for ink [$cm^3$] = V | | 70.0 | 70.0 | 70.0 | 70.0 | 70.0 | 70.0 | 70.0 |
| Ratio (A/V) | | 0.00 | 0.00 | 0.00 | 0.00 | 0.00 | 0.00 | 0.00 |
| Presence or absence of air in ink accommodating body | | Present | Present | Present | Present | Present | Present | Absent |
| Storage stability of ink | | B | S | B | S | B | S | B |
| Hue | | S | B | S | B | S | B | S |
| Ozone fastness | | A | A | A | A | A | A | A |
| Clogging recovery ability | | S | S | S | S | S | S | S |

| | | Comparative Examples | | | | | |
|---|---|---|---|---|---|---|---|
| | | 1 | 2 | 3 | 4 | 5 | 6 |
| Formula of dye compound | B-1 | 1.00 | 0.40 | 1.00 | 1.00 | 3.00 | — |
| | B-2 | — | — | — | — | — | 1.00 |
| | M-1 | 0.10 | 0.10 | — | 0.10 | 0.30 | 0.10 |
| | M-2 | 0.30 | 0.10 | — | 0.10 | 0.50 | 0.30 |
| | M-3 | — | — | 0.50 | — | — | — |
| | Y-1 | 0.30 | 0.20 | 0.30 | - | 0.80 | 0.30 |
| | Y-2 | — | — | — | 0.50 | — | — |
| Alkanolamine | Triisopropanolamine | 0.20 | 0.20 | 0.20 | 0.20 | 0.20 | 0.20 |
| | Triethanolamine | — | — | — | — | — | — |
| Organic acid | Adipic acid | 0.02 | 0.02 | 0.02 | 0.02 | 0.02 | 0.02 |
| | Water | Remaining amount | Remaining amount | Remaining amount | Remaining amount | Remaining amount | Remaining amount |
| | pH | 7.80 | 7.80 | 7.80 | 7.80 | 7.80 | 7.80 |
| Amount of solid contents of dyes | | 1.70 | 0.80 | 1.80 | 1.70 | 4.60 | 1.70 |
| Total surface area of metal [$cm^2$] = A | | 24.0 | 19.0 | 24.0 | 24.0 | 24.0 | 0.0 |
| Accommodation capacity for ink [$cm^3$] = V | | 12.0 | 12.0 | 12.0 | 12.0 | 12.0 | 70.0 |
| Ratio (A/V) | | 2.00 | 1.60 | 2.00 | 2.00 | 2.00 | 0.00 |
| Presence or absence of air in ink accommodating body | | Present | Present | Present | Present | Present | Present |

TABLE 2-continued

| | | | | | | |
|---|---|---|---|---|---|---|
| Storage stability of ink | D | B | D | D | C | A |
| Hue | A | B | C | C | A | C |
| Ozone fastness | A | C | A | A | A | C |
| Clogging recovery ability | S | S | A | A | A | A |

In Tables 1 and 2, "B-1", "M-1", "M-2", "M-3", "Y-1", and "Y-2", which are written in the column of Dye compound formula, are respectively "lithium salts of the compound represented by Formula (B-1)", "sodium salts of the compound represented by Formula (M-1)", "sodium and/or ammonium salts of the compound represented by Formula (M-2)", "lithium salts of the compound represented by Formula (M-3)", "lithium salts of the compound represented by Formula (Y-1)", and "potassium salts of the compound represented by Formula (Y-2)", which are described above.

Furthermore, in Tables 1 and 2, "B-2" written in the column of Dye compound formula is "sodium and/or ammonium salts of the compound represented by Formula (B-2)".

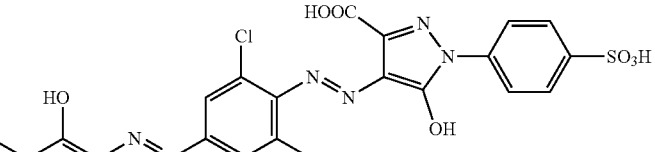

Formula (B-2)

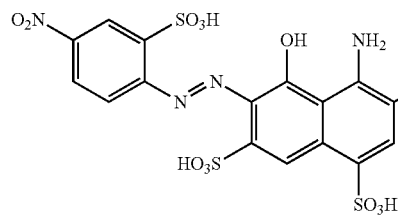

Tables 1 and 2 show a pH of the ink compositions, an amount of solid contents of dyes, a total surface area of a metal A (cm$^2$), an ink accommodation capacity V (cm$^3$), a ratio (A/V), and the presence or absence of air in the ink accommodating body. In an example in which a total surface area A (cm$^2$) of a metal is 0.0, the above-described ink accommodating body 63 was used. In an example in which a total surface area A (cm$^2$) of a metal is "12.0", "19.0", and "24.0", metal pieces having the respective surface areas were put into the ink accommodating body 63. A total surface area A of a metal (cm$^2$) and an ink accommodation capacity V (cm$^3$) of Comparative Example 1 correspond to a total surface area of a metal and an ink accommodation capacity of ink cartridges, which are ink accommodating bodies, such as an ink jet printer EP-803A (manufactured by Seiko Epson Corporation). In Example 20 of "None" of air in the ink accommodating body, a flexible pack made of polyethylene was used, and an ink was sealed so that there was no air layer in the pack.

2.2. Evaluation Method 2.2.1. Storage Stability of Ink Composition

The ink accommodating body accommodating the ink composition of each of the examples was left to stand in a constant-temperature tank at 60° C. for 7 days.

Judgment was made according to the following criteria based on a rate of change in an absorbance (ABS) of the ink composition before and after the standing. The results are shown in Tables 1 and 2. As for the absorbance, each of the ink composition was diluted 1000 times with ultrapure water, and a maximum absorbance at a maximum peak of the ultraviolet-visible absorption spectrum was measured using an ultraviolet-visible spectrophotometer under the following conditions.

S: Rate of change<2%
A: 2%≤rate of change<3%
B: 3%≤rate of change<5%
C: 5%≤rate of change<8%
D: 8%≤rate of change Equipment: Ultraviolet-visible spectrophotometer V-770 series (manufactured by JASCO Corporation)

Parameter file

Metering mode: ABS
Measuring range: 800 to 300 nm
Data acquisition interval: 0.5 nm
UV/Vis bandwidth: 2.0 nm
NIR bandwidth: 8.0 nm
UV/Vis response: 0.06 sec
NIR response: 0.06 sec
Scanning speed: 400 nm/min
Light source switching: 340 nm
Diffraction grating switching: 850 nm
Light source: D2/WI
Filter switching: step
Correction: baseline 2.2.2. Hue Values of a* and b* when printing was performed in a single color and at a duty of 50% under the following conditions were judged according to the following criteria. The results are shown in Tables 1 and 2.

Aircraft: EP-10A (manufactured by Seiko Epson Corporation), EPSON glossy photo paper Color measurement: i1 (manufactured by X-rite)

S: a* value is within the range of −2 or more and +2 or less, and b* value is within the range of −2 or more and +2 or less.

A: a range other than S, a* value is within the range of −4 or more and +4 or less, and b* value is within the range of −4 or more and +4 or less.

B: a range other than A, a* value is within the range of −7 or more and +7 or less, and b* value is within the range of −7 or more and +7 or less.

C: at least one of a* value and b* value is outside the range of −7 or more and +7 or less.

2.2.3. Ozone Fastness

A rate of change of an optical density (OD) value of a sample printed and left to stand under the following conditions was judged according to the following criteria. The results are shown in Tables 1 and 2.

Aircraft: EP-10A (manufactured by Seiko Epson Corporation), EPSON glossy photo paper Conditions: ozone concentration of 5 ppm×80 hours S: OD residual rate of 85% or more
A: OD residual rate of 80% or more and less than 85%
B: OD residual rate of 70% or more and less than 80%
C: OD residual rate of less than 70%

2.2.3. Clogging Recovery Ability

The ink composition of each of the examples was supplied to a head of EP-10A (manufactured by Seiko Epson Corporation), and ejecting from all nozzles was confirmed to be normal. Thereafter, the ink composition was left to stand in an environment of 40° C. and 24% humidity for 1 week. Thereafter, the number of cleanings required for ejecting from all nozzles to be normal was determined according to the following criteria. The results are shown in Tables 1 and 2.

S: 0 times or 1 time
A: 2 or 3 times
B: 4 or 5 times
C: 6 times or more 2.3. Evaluation Results In all of the ink accommodating bodies of each of the examples, storage stability of the ink composition was good, where the ink accommodating body accommodates the ink composition containing water and the first dye that is the compound represented by Formula (B-1) or a salt thereof, in which a content of the first dye is 0.5% by mass or more with respect to a total amount of the ink composition, and a value of a ratio (A/V) is 1.7 or less. Furthermore, all of the ink compositions of each of the examples enabled formation of an image having good ozone fastness.

The above-described embodiment and modification thereof are merely examples, and the present disclosure is not limited thereto. For example, each embodiment and each modification can be combined as appropriate.

The present disclosure includes a configuration substantially the same as the configuration described in the embodiment, for example, a configuration having the same function, method, and results, or a configuration having the same object and effect. The present disclosure also includes a configuration in which a non-essential part of the configuration described in the embodiment is replaced. The present disclosure also includes a configuration that exhibits the same effects as the configuration described in the embodiment or a configuration that can achieve the same object. The present disclosure also includes a configuration in which a known technique is added to the configuration described in the embodiment.

The following contents are derived from the above-described embodiment and modification thereof.

An ink accommodating body is an ink accommodating body accommodating an ink composition, in which the ink composition contains water and a first dye that is a compound represented by Formula (B-1) or a salt thereof, a content of the first dye in the ink composition is 0.5% by mass or more with respect to a total amount of the ink composition, and a value of a ratio (A/V) is 1.7 or less where a total surface area of a metal, of the ink accommodating body, in contact with the ink composition is A (cm$^2$) and an accommodation capacity for the ink composition accommodated in the ink accommodating body is V (cm$^3$).

Formula (B-1)

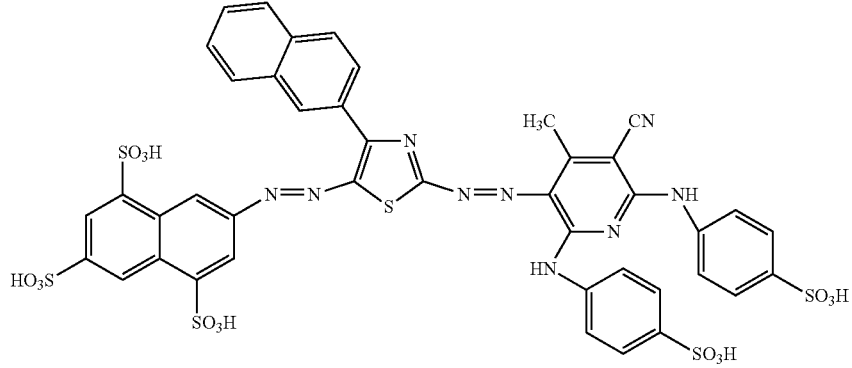

According to this ink accommodating body, the first dye in the accommodated ink composition can be stored in a state where the first dye exhibits good color developability. Furthermore, the ink composition accommodated in this ink accommodating body enables formation of an image having good ozone fastness.

In the above-described ink accommodating body, the ink composition may contain a second dye having a maximum absorption wavelength of 500 nm or more and 580 nm or less, and a content of the second dye in the ink composition may be 0.2% by mass or more and 2.0% by mass or less with respect to the total amount of the ink composition.

According to this ink accommodating body, the second dye functions as a complementary color to a tint of the first dye contained in the accommodated ink composition, and thereby an image having a more neutral hue can be formed with the accommodated ink composition.

In the above-described ink accommodating body, the second dye may be selected from a compound represented by Formula (M-1) or a salt thereof and a compound represented by Formula (M-2) or a salt thereof.

Formula (M-1)

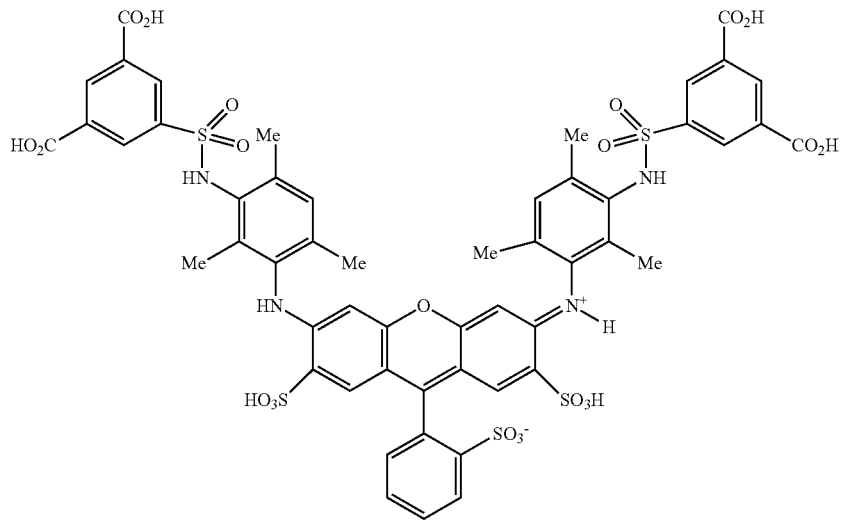

Formula (M-2)

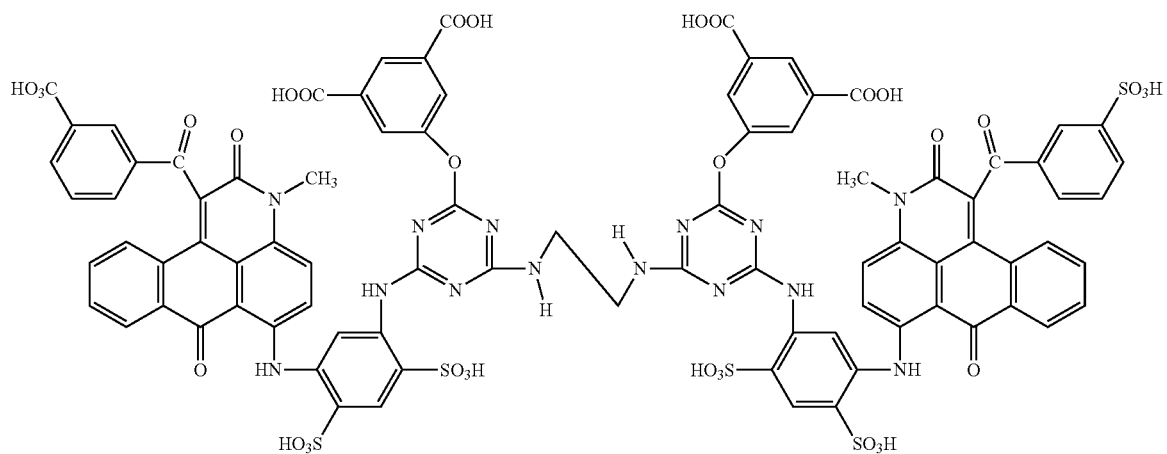

According to this ink accommodating body, the second dye more effectively functions as a complementary color to a tint of the first dye, and thereby an image having a more neutral hue can be formed with the accommodated ink composition.

In the above-described ink accommodating body, the ink composition may contain the compound represented by Formula (M-1) or a salt thereof and the compound represented by Formula (M-2) or a salt thereof, and a content of the compound represented by Formula (M-1) or a salt thereof in the ink composition may be smaller than a content of the compound represented by Formula (M-2) or a salt thereof in the ink composition.

According to this ink accommodating body, an image having a more neutral hue can be formed with the accommodated ink composition.

In the above-described ink accommodating body, the ink composition may contain a third dye having a maximum absorption wavelength of less than 480 nm, and a content of the third dye may be 0.2% by mass or more and 2.0% by mass or less with respect to the total amount of the ink composition.

According to this ink accommodating body, an image having a more neutral hue can be formed with the accommodated ink composition.

In the above-described ink accommodating body, the third dye is a compound represented by Formula (Y-1) or a salt thereof.

Formula (Y-1)

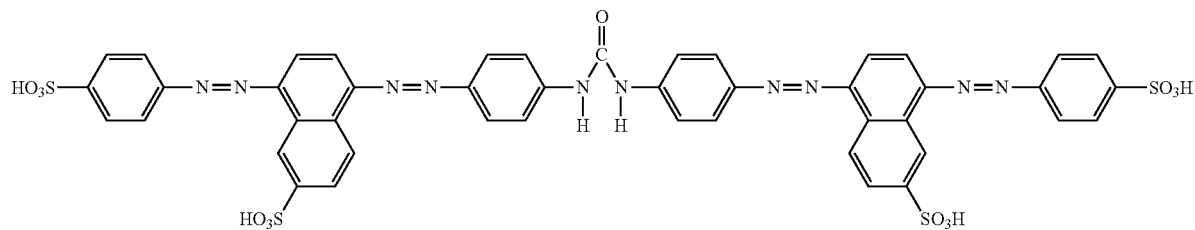

According to this ink accommodating body, an image having a more neutral hue can be formed with the accommodated ink composition.

In the above-described ink accommodating body, a total amount of solid contents of the dye may be 6.8% by mass or less with respect to the total amount of the ink composition.

According to this ink accommodating body, an image having a more neutral hue can be formed with the accommodated ink composition.

In the above-described ink accommodating body, a portion, of the ink accommodating body, in contact with the ink composition may not contain a metal.

According to this ink accommodating body, storage stability of the first dye can be further improved.

In the above-described ink accommodating body, the ink accommodating body may have a structure in which the ink composition is in contact with air in a state where the ink composition is accommodated in the ink accommodating body.

According to this ink accommodating body, it is possible to inhibit the dye contained in the accommodated ink composition from being reduced and deteriorated due to the oxidizing action of oxygen in the air.

In the above-described ink accommodating body, the ink composition may further contain an alkanolamine having 3 or more carbon atoms, and the content of the alkanolamine and the content of the first dye may satisfy the relationship of Expression (1).

$$0.1 < (\text{content of alkanolamine})/(\text{content of first dye}) < 0.6 \quad (1)$$

According to this ink accommodating body, an image having a more neutral hue can be formed with the accommodated ink composition.

In the above-described ink accommodating body, the ink composition may further contain an organic acid, and a content of the organic acid and the content of the first dye may satisfy the relationship of Expression (2).

$$0.01 < (\text{content of organic acid})/(\text{content of first dye}) < 0.1 \quad (2)$$

According to this ink accommodating body, an image having a more neutral hue can be formed with the accommodated ink composition.

An ink composition contains water; a first dye that is a compound represented by Formula (B-1) or a salt thereof; and a second dye selected from a compound represented by Formula (M-1) or a salt thereof and a compound represented by Formula (M-2) or a salt thereof, in which a content of the first dye is 0.5% by mass or more with respect to a total amount of the ink composition.

Formula (B-1)

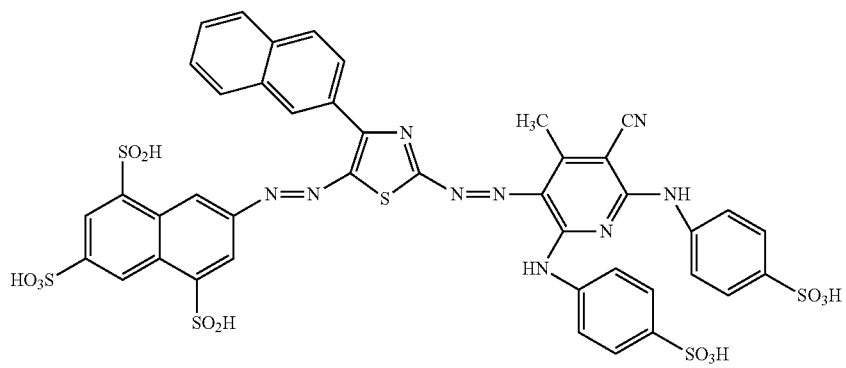

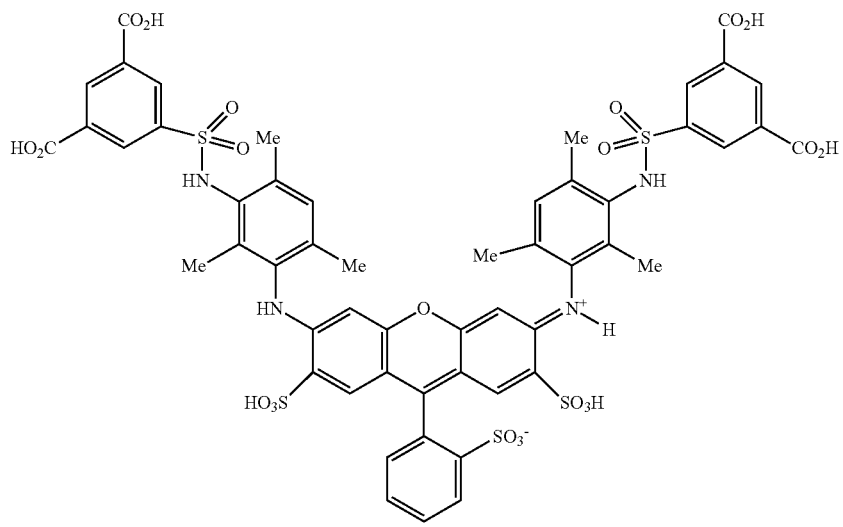
Formula (M-1)
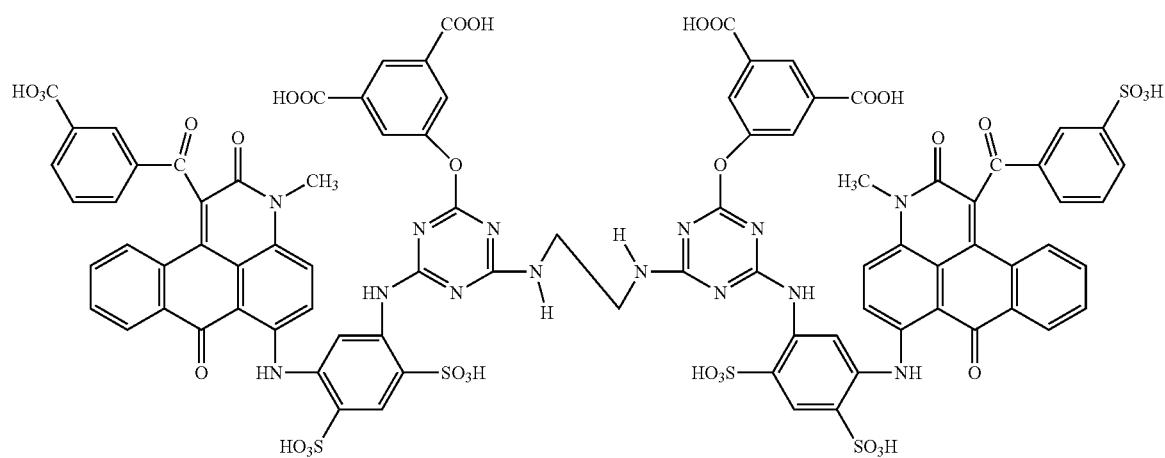
Formula (M-2)

According to this ink composition, it is possible to form an image in which granularity is inhibited and ozone fastness is good and which has a neutral hue.

An ink composition is an ink composition accommodated in an ink accommodating body, the ink composition containing: water; and a first dye that is a compound represented by Formula (B-1) or a salt thereof, in which a content of the first dye is 0.5% by mass or more with respect to a total amount of the ink composition, and a value of a ratio (A/V) is 1.7 or less where a total surface area of a metal, of the ink accommodating body, in contact with the ink composition is A (cm$^2$) and an accommodation capacity for the ink composition accommodated in the ink accommodating body is V (cm$^3$).

accommodation capacity for the ink composition accommodated in the ink accommodating body is V (cm$^3$), the ink accommodating body is in the form of a replenishing bottle, a portion of the ink accommodating body in contact with the ink composition does not contain a metal, the second dye is selected from a compound represented by Formula (M-1) or a salt thereof and a compound represented by Formula (M-2) or a salt thereof, the ink composition contains the compound represented by Formula (M-1) or a salt thereof and the compound represented by Formula (M-2) or salt thereof,

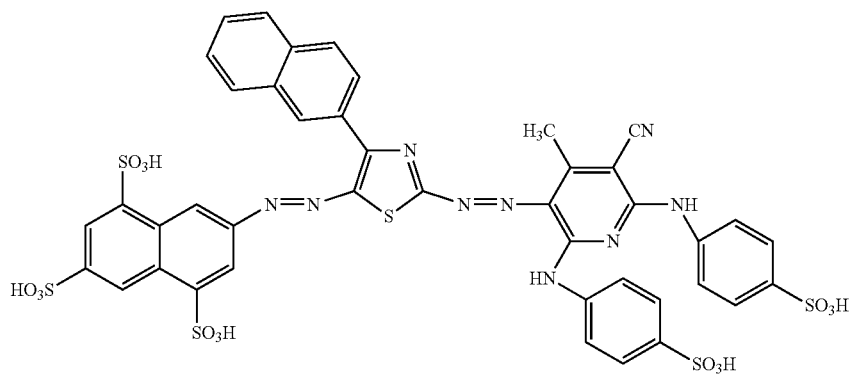

Formula (B-1)

According to this ink composition, it is possible to form an image in which granularity is inhibited and ozone fastness is good, and it is possible to improve storage stability.

What is claimed is:

1. An ink accommodating body accommodating an ink composition, wherein
    the ink composition contains water, a first dye that is a compound represented by Formula (B-1) or a salt thereof, and a second dye having a maximum absorption wavelength of 500 nm or more and 580 nm or less,
    a content of the first dye in the ink composition is 0.5% by mass or more with respect to a total amount of the ink composition,
    a content of the second dye in the ink composition is 0.2% by mass or more and 2.0% by mass or less the total amount of the ink composition,
    a value of a ratio (A/V) is 1.7 or less where a total surface area of a metal of the ink accommodating body, in contact with the ink composition is A (cm$^2$) and an a content of the compound represented by Formula (M-1) or a salt thereof in the ink composition is smaller than a content of the compound represented by Formula (M-2) or a salt thereof in the ink composition, and a total amount of the solid contents of the dyes is 6.0% by mas or less with respect to the total amount of the ink composition.

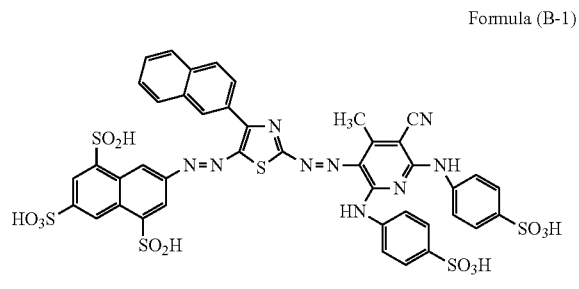

Formula (B-1)

Formula (M-1)

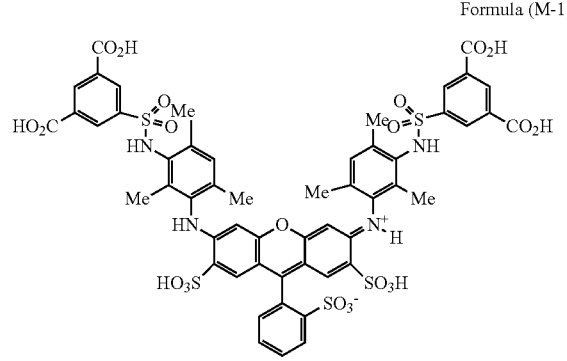

Formula (M-2)

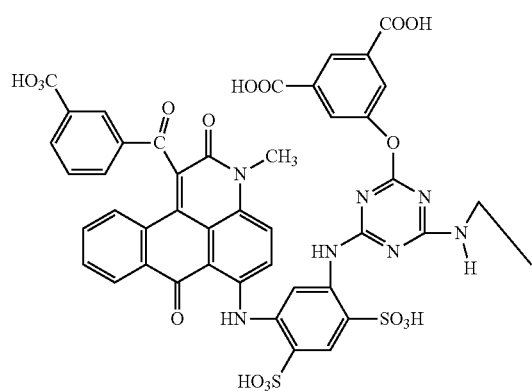

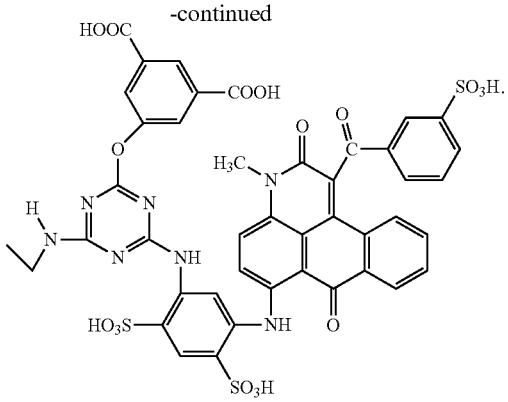

2. The ink accommodating body according to claim 1, wherein
the ink composition contains a third dye having a maximum absorption wavelength of less than 480 nm, and
a content of the third dye is 0.2% by mass or more and 2.0% by mass or less with respect to the total amount of the ink composition.

3. The ink accommodating body according to claim 2, wherein the third dye is a compound represented by Formula (Y-1) or a salt thereof, Formula (Y-1)

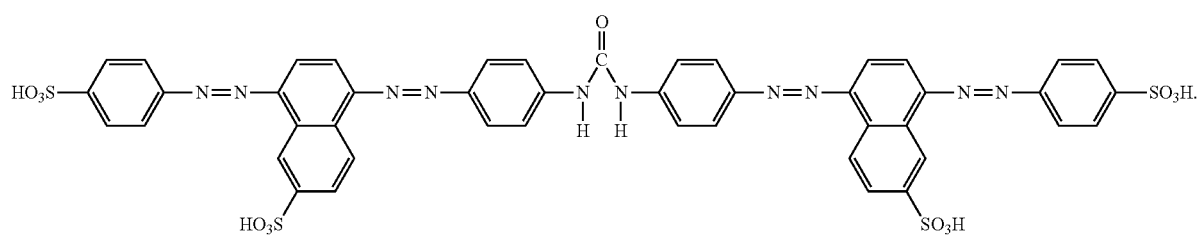

4. The ink accommodating body according to claim 1, wherein
the ink accommodating body has a structure in which the ink composition is in contact with air in a state where the ink composition is accommodated in the ink accommodating body.

5. The ink accommodating body according to claim 1, wherein
the ink composition further contains an alkanolamine having 3 or more carbon atoms, and
a content of the alkanolamine and the content of the first dye satisfy a relationship of Expression (1), $$0.1 < (\text{content of alkanolamine})/(\text{content of first dye}) < 0.6 \quad (1).$$

6. The ink accommodating body according to claim 1, wherein
the ink composition further contains an organic acid, and
a content of the organic acid and the content of the first dye satisfy a relationship of Expression (2), $$0.01 < (\text{content of organic acid})/(\text{content of first dye}) < 0.1 \quad (2).$$

* * * * *